US012200765B2

(12) United States Patent
Mistry et al.

(10) Patent No.: US 12,200,765 B2
(45) Date of Patent: Jan. 14, 2025

(54) PACKET DETECTION ACROSS SUB-BANDS

(71) Applicant: QUALCOMM Incorporated, San Diego, CA (US)

(72) Inventors: Shwetank Kishorkumar Mistry, Bangalore (IN); Qinfang Sun, Cupertino, CA (US); Didier Johannes Richard Van Nee, Tull en 't Waal (NL); Deniz Rende, San Jose, CA (US); Vivek Thekkedath, San Jose, CA (US); Amrutraj Joshi, Dharwad (IN)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/728,723

(22) Filed: Apr. 25, 2022

(65) Prior Publication Data
US 2023/0345528 A1 Oct. 26, 2023

(51) Int. Cl.
*H04W 74/0808* (2024.01)
(52) U.S. Cl.
CPC ............... *H04W 74/0808* (2013.01)
(58) Field of Classification Search
None
See application file for complete search history.

(56) References Cited

U.S. PATENT DOCUMENTS

| | | | | |
|---|---|---|---|---|
| 8,483,235 B2* | 7/2013 | Cheong | ................ | H04B 7/0413 370/480 |
| 9,385,911 B2* | 7/2016 | Vermani | ................ | H04L 69/18 |
| 9,843,654 B2* | 12/2017 | Vermani | ................ | H04L 1/0039 |
| 9,935,664 B1* | 4/2018 | Dai | ........................ | H04B 1/1027 |
| 10,148,399 B2* | 12/2018 | Zhang | ................ | H04W 84/12 |
| 10,530,546 B2* | 1/2020 | Zhang | ................ | H04W 84/12 |
| 12,003,356 B2* | 6/2024 | Park | .................... | H04L 27/2621 |
| 2009/0190686 A1* | 7/2009 | Cheong | ................ | H04B 7/0684 375/267 |
| 2013/0121243 A1* | 5/2013 | Vermani | ............... | H04L 1/0029 370/328 |
| 2013/0128806 A1* | 5/2013 | Vermani | ................ | H04L 69/22 370/328 |
| 2016/0277543 A1* | 9/2016 | Vermani | ................ | H04L 69/18 |
| 2019/0089503 A1* | 3/2019 | Zhang | ................ | H04L 5/0048 |
| 2020/0328856 A1* | 10/2020 | Cao | ...................... | H04L 27/2602 |
| 2021/0289500 A1* | 9/2021 | Yang | ................ | H04W 72/0453 |
| 2022/0021569 A1* | 1/2022 | Park | ........................ | H04J 13/00 |

(Continued)

OTHER PUBLICATIONS

Partial International Search Report—PCT/US2023/016625—ISA/EPO—Jun. 26, 2023.

(Continued)

*Primary Examiner* — Faiyazkhan Ghafoerkhan
(74) *Attorney, Agent, or Firm* — Loza & Loza LLP

(57) ABSTRACT

Aspects relate to outputting a training field signal and/or obtaining a training field signal over multiple radio frequency (RF) sub-bands. For example, a carrier bandwidth used by a first apparatus to transmit packets may include several RF sub-bands. The first apparatus may use two or more of these RF sub-bands to transmit a training field signal. In some examples, the first apparatus may repeat the same training field signal over multiple RF sub-bands. In some examples, the second apparatus may combine the training field signal sent over the multiple RF sub-bands.

19 Claims, 17 Drawing Sheets

(56) References Cited

U.S. PATENT DOCUMENTS

| | | | |
|---|---|---|---|
| 2022/0029772 A1* | 1/2022 | Wu | H04L 5/0044 |
| 2022/0038315 A1* | 2/2022 | Park | H04L 27/26132 |
| 2023/0345528 A1* | 10/2023 | Mistry | H04L 1/04 |

OTHER PUBLICATIONS

International Search Report and Written Opinion—PCT/US2023/016625—ISA/EPO—Sep. 15, 2023.

* cited by examiner

PACKET DETECTION ACROSS SUB-BANDS

TECHNICAL FIELD

The technology discussed below relates generally to wireless communication and, more particularly, to detecting a packet across multiple radio frequency sub-bands.

INTRODUCTION

Wireless communication networks are widely deployed to provide various communication services. Some of these networks may be multiple access networks that support communication for multiple users by sharing available network resources. For example, a wireless communication device (e.g., a station) may communicate with another wireless communication device (e.g., an access point or a station) of a network to gain access to communication services provided by the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus may include an interface and a processing system. The processing system may be configured to obtain, via the interface, training field information associated with a packet from a second apparatus over at least two radio frequency sub-bands of a plurality of radio frequency sub-bands. In some examples, the training field information includes a training field sequence that is duplicated over each of the at least two radio frequency sub-bands. The processing system may also be configured to obtain, via the interface, payload information associated with the packet over the plurality of radio frequency sub-bands. In some examples, the payload information includes payload data that is duplicated over each of the plurality of radio frequency sub-bands. The processing system may be further configured to combine the payload data duplicated over each of the plurality of radio frequency sub-bands to provide combined payload data. In addition, the processing system may be further configured to output the combined payload data via the interface.

In some examples, a method for communication at a first apparatus is disclosed. The method may include obtaining training field information associated with a packet from a second apparatus over at least two radio frequency sub-bands of a plurality of radio frequency sub-bands. In some examples, the training field information includes a training field sequence that is duplicated over each of the at least two radio frequency sub-bands. The method may also include obtaining payload information associated with the packet over the plurality of radio frequency sub-bands. In some examples, the payload information includes payload data that is duplicated over each of the plurality of radio frequency sub-bands. The method may further include combining the payload data duplicated over each of the plurality of radio frequency sub-bands to provide combined payload data. In addition, the method may include outputting the combined payload data.

In some examples, a first apparatus may include means for obtaining training field information associated with a packet from a second apparatus over at least two radio frequency sub-bands of a plurality of radio frequency sub-bands. In some examples, the training field information includes a training field sequence that is duplicated over each of the at least two radio frequency sub-bands. The first apparatus may also include means for obtaining payload information associated with the packet over the plurality of radio frequency sub-bands. In some examples, the payload information includes payload data that is duplicated over each of the plurality of radio frequency sub-bands. The first apparatus may further include means for combining the payload data duplicated over each of the plurality of radio frequency sub-bands to provide combined payload data. In addition, the first apparatus may include means for outputting the combined payload data.

In some examples, a non-transitory computer-readable medium has stored therein instructions executable by a processing system of a first apparatus to obtain training field information associated with a packet from a second apparatus over at least two radio frequency sub-bands of a plurality of radio frequency sub-bands. In some examples, the training field information includes a training field sequence that is duplicated over each of the at least two radio frequency sub-bands. The computer-readable medium may also have stored therein instructions executable by the processing system of the first apparatus to obtain payload information associated with the packet over the plurality of radio frequency sub-bands. In some examples, the payload information includes payload data that is duplicated over each of the plurality of radio frequency sub-bands. The computer-readable medium may further have stored therein instructions executable by the processing system of the first apparatus to combine the payload data duplicated over each of the plurality of radio frequency sub-bands to provide combined payload data. In addition, the computer-readable medium may have stored therein instructions executable by the processing system of the first apparatus to output the combined payload data.

In some examples, a first apparatus may include an interface and a processing system. The processing system may be configured to obtain, via the interface, first training field information associated with a first packet detected over a first quantity of radio frequency sub-bands of a plurality of radio frequency sub-bands using a first packet detection threshold. The processing system may also be configured to obtain, via the interface, second training field information associated with a second packet detected over a second quantity of radio frequency sub-bands of the plurality of radio frequency sub-bands using a second packet detection threshold. In some examples, the second quantity of radio frequency sub-bands is different from the first quantity of radio frequency sub-bands. In some examples, the second packet detection threshold is different from the first packet detection threshold.

In some examples, a method for communication at a first apparatus is disclosed. The method may include obtaining first training field information associated with a first packet detected over a first quantity of radio frequency sub-bands of a plurality of radio frequency sub-bands using a first packet detection threshold. The method may also include obtaining second training field information associated with a second packet detected over a second quantity of radio frequency sub-bands of the plurality of radio frequency sub-bands using a second packet detection threshold. In some examples, the second quantity of radio frequency sub-bands is different from the first quantity of radio frequency sub-bands. In some examples, the second packet detection threshold is different from the first packet detection threshold.

In some examples, a first apparatus may include means for obtaining first training field information associated with a first packet detected over a first quantity of radio frequency sub-bands of a plurality of radio frequency sub-bands using a first packet detection threshold. The first apparatus may also include means for obtaining second training field information associated with a second packet detected over a second quantity of radio frequency sub-bands of the plurality of radio frequency sub-bands using a second packet detection threshold. In some examples, the second quantity of radio frequency sub-bands is different from the first quantity of radio frequency sub-bands. In some examples, the second packet detection threshold is different from the first packet detection threshold.

In some examples, a non-transitory computer-readable medium has stored therein instructions executable by a processing system of a first apparatus to obtain, via the interface, first training field information associated with a first packet detected over a first quantity of radio frequency sub-bands of a plurality of radio frequency sub-bands using a first packet detection threshold. The computer-readable medium may also have stored therein instructions executable by the processing system of the first apparatus to obtain second training field information associated with a second packet detected over a second quantity of radio frequency sub-bands of the plurality of radio frequency sub-bands using a second packet detection threshold. In some examples, the second quantity of radio frequency sub-bands is different from the first quantity of radio frequency sub-bands. In some examples, the second packet detection threshold is different from the first packet detection threshold.

In some examples, a first apparatus may include an interface and a processing system. The processing system may be configured to output, via the interface for transmission to a second apparatus, training field information of a packet over at least two radio frequency sub-bands of a plurality of radio frequency sub-bands. The processing system may also be configured to output, via the interface for transmission to the second apparatus, payload information associated with the packet over the plurality of radio frequency sub-bands. In some examples, the payload information is duplicated over each of the plurality of radio frequency sub-bands.

In some examples, a method for communication at a first apparatus is disclosed. The method may include outputting, for transmission to a second apparatus, training field information of a packet over at least two radio frequency sub-bands of a plurality of radio frequency sub-bands. The method may also include outputting, for transmission to the second apparatus, payload information associated with the packet over the plurality of radio frequency sub-bands. In some examples, the payload information is duplicated over each of the plurality of radio frequency sub-bands.

In some examples, a first apparatus may include means for outputting, for transmission to a second apparatus, training field information of a packet over at least two radio frequency sub-bands of a plurality of radio frequency sub-bands. The first apparatus may also include means for outputting, for transmission to the second apparatus, payload information associated with the packet over the plurality of radio frequency sub-bands. In some examples, the payload information is duplicated over each of the plurality of radio frequency sub-bands.

In some examples, a non-transitory computer-readable medium has stored therein instructions executable by a processing system of a first apparatus to output, for transmission to a second apparatus, training field information of a packet over at least two radio frequency sub-bands of a plurality of radio frequency sub-bands. The computer-readable medium may also have stored therein instructions executable by the processing system of the first apparatus to output, for transmission to the second apparatus, payload information associated with the packet over the plurality of radio frequency sub-bands. In some examples, the payload information is duplicated over each of the plurality of radio frequency sub-bands.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
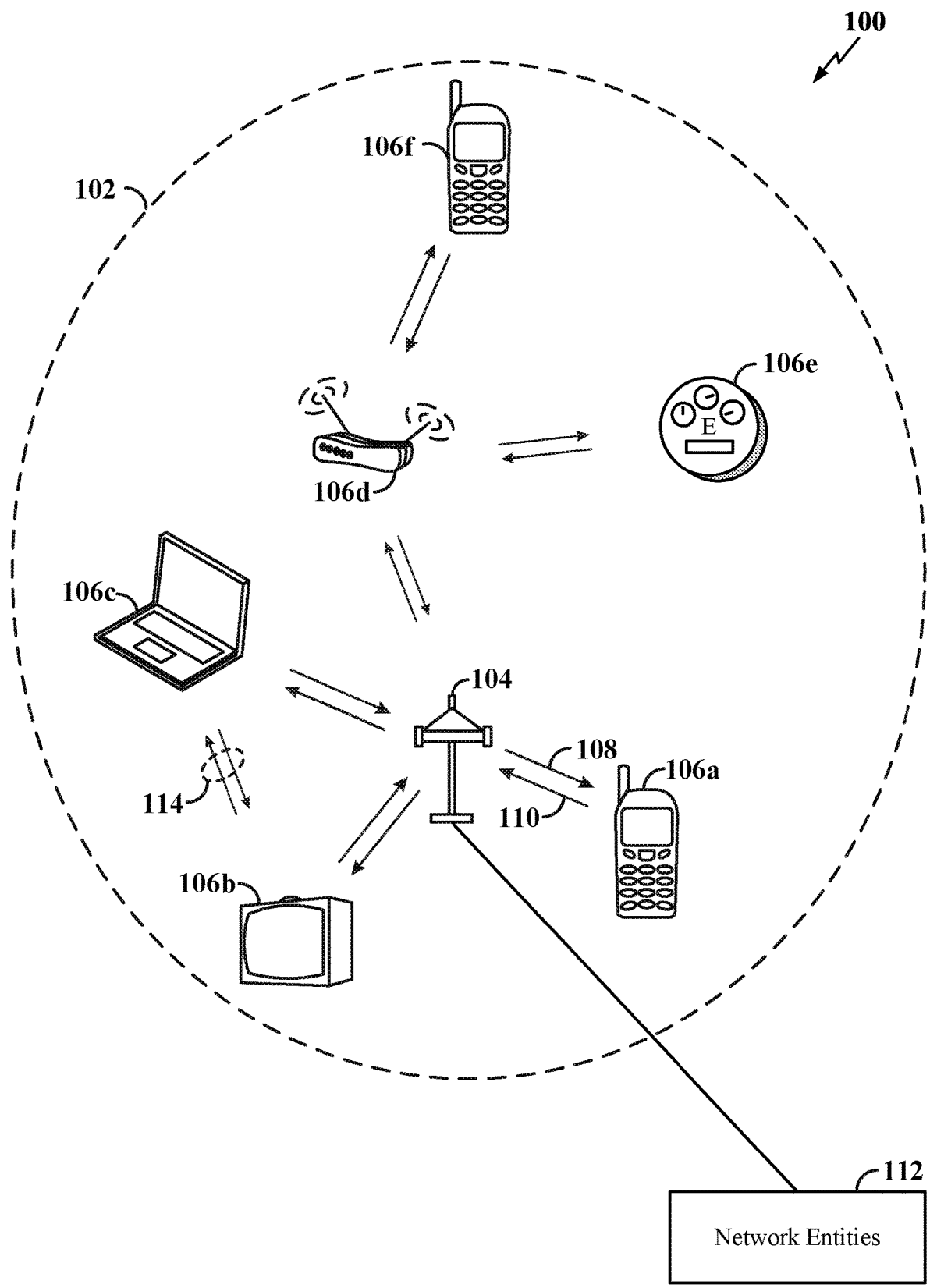
FIG. 1 is a conceptual illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate to the transmission of a training field signal and/or the detection of a training field signal over multiple radio frequency (RF) sub-bands. For example, a carrier bandwidth used by a first apparatus to transmit packets may include several RF sub-bands. In contrast with an apparatus that uses only one RF sub-band to transmit training field signals, the first apparatus may use two or more RF sub-bands to transmit a training field signal.

In some examples, the first apparatus may repeat the same information over multiple RF sub-bands. In some aspects, this may improve training field signal detection performance at a second apparatus since the second apparatus may combine the information sent over the multiple RF sub-bands.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100 including various wireless communication nodes. For convenience, a wireless communication node may be referred to herein as a wireless node. In some examples, the wireless communication system 100 may operate pursuant to a wireless communication standard, for example, the Institute of Electrical and Electronics Engineers (IEEE) 802.11 standard.

In some examples, a wireless node is a node (e.g., a device, an entity, etc.) that utilizes wireless spectrum (e.g., the radio frequency (RF) spectrum) to communicate with another node. In some examples, a wireless node may be a mobile apparatus. A mobile apparatus may be referred to as a station (STA) in IEEE 802.11, but may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A mobile apparatus need not necessarily have a capability to move, and may be stationary. The term mobile apparatus or mobile device broadly refers to a diverse array of devices and technologies. Mobile apparatuses may include a number of hardware structural components sized, shaped, and arranged to help in communication. Such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QoS) for transport of critical service data.

In some examples, a wireless node may be an access point. In 802.11, an access point may be a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

Figure 2:
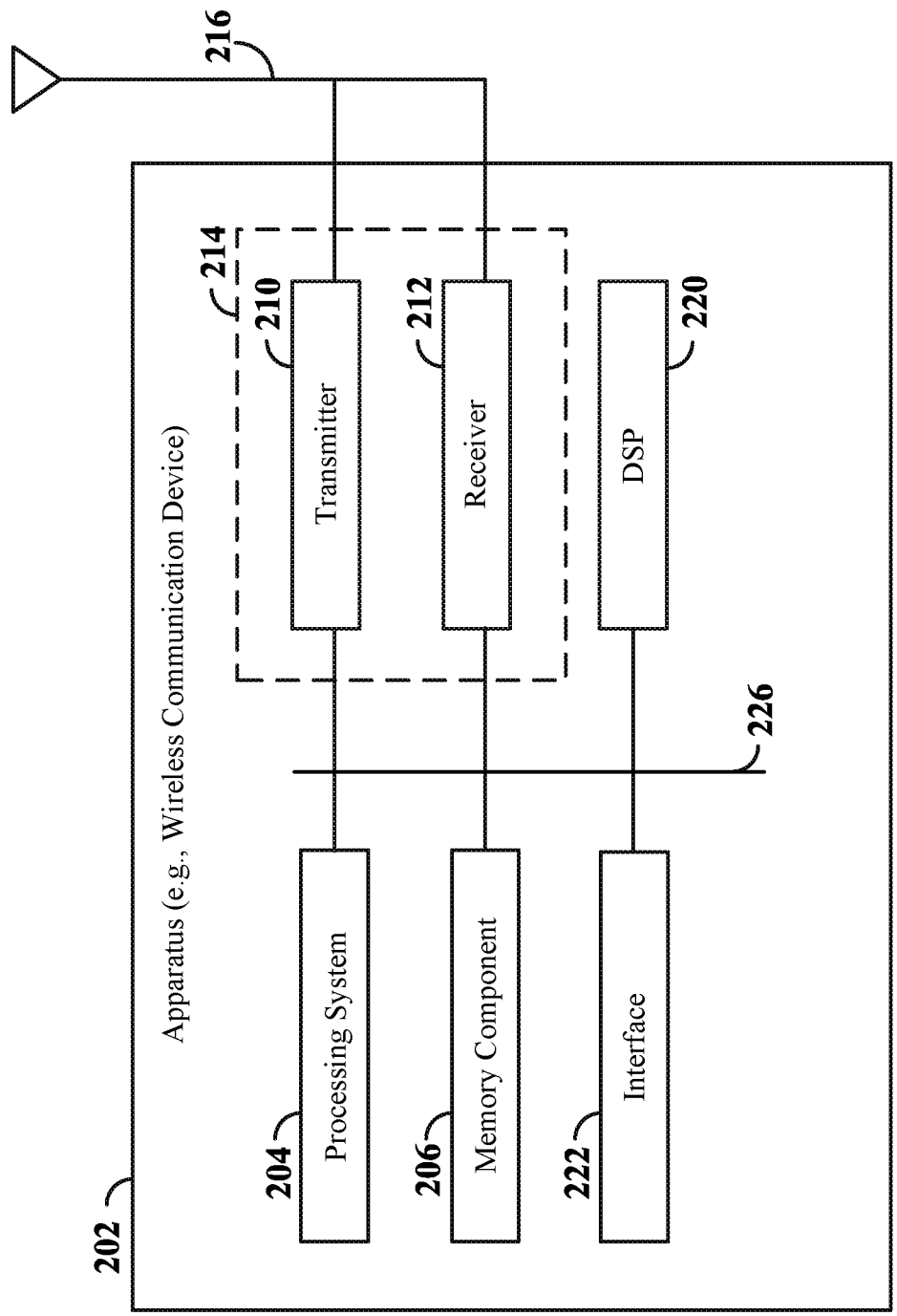
FIG. 2 is a block diagram of an example of an apparatus (e.g., a wireless communication device) according to some aspects.

In the example of FIG. 2, an access point (AP) 104 is deployed in a network to provide access to one or more services (e.g., network connectivity) for one or more stations (STAs) such as the STAs 106a, 106b, 106c, 106d, 106e, and 106f (which may be referred to herein collectively as STAs 106 or separately as a station (STA) 106) that may be installed within or that may roam throughout a coverage area of the network. Thus, at various points in time, a STA 106 may connect to the AP 104 or to some other access point in the network (not shown). In some examples, the AP 104 may be referred to as an AP STA. In some examples, the STAs 106 may be referred to as non-AP STAs.

A variety of processes and methods may be used for transmissions in the wireless communication system 100 between the AP 104 and the STAs 106. For example, signals may be sent and received between the AP 104 and the STAs 106 in accordance with orthogonal frequency-division multiplexing (OFDM) and orthogonal frequency-division multiple access (OFDMA) techniques. In this case, the wireless communication system 100 may be referred to as an OFDM/OFDMA system. However, within the scope of the disclosure, multiplexing and multiple access are not limited to the above schemes, and may be provided utilizing time division multiple access (TDMA), code division multiple access (CDMA), frequency division multiple access (FDMA), spatial division multiple access (SDMA), sparse code multiple access (SCMA), resource spread multiple access (RSMA), or other suitable multiple access schemes.

A communication link that facilitates transmission from the AP 104 to one or more of the STAs 106 may be referred to as a downlink (DL) (e.g., the downlink 108), and a communication link that facilitates transmission from one or more of the STAs 106 to the AP 104 may be referred to as an uplink (UL) (e.g., the uplink 110). Alternatively, a downlink 108 may be referred to as a forward link or a forward channel, and an uplink 110 may be referred to as a reverse link or a reverse channel. Other terminology may be used for these links in other examples.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS).

The AP 104 and each STA 106 may exchange data units that can include control information and/or data. At the physical (PHY) layer, such a data unit may be referred to as a physical layer protocol data unit (PPDU). In some aspects, a PPDU may be referred to as a packet or physical layer packet. Each PPDU may include a preamble and a payload. The preamble may include at least one training field (e.g., used for synchronization) and at least one signaling (SIG) field (e.g., used for control signaling). The payload may include a medium access control (MAC) header or data for other layers, and/or user data, for example. The payload may be transmitted using one or more data symbols. The systems, methods, and devices herein may utilize data units with training fields whose peak-to-power ratio has been minimized.

The wireless communication system 100 may employ methods to allow efficient access of the wireless communication medium based on unpredictable data transmissions while avoiding collisions. For example, to gain access to a channel, a device in the wireless communication system 100 may support a medium access control (MAC) distributed coordination function (DCF) that employs a carrier sense multiple access/collision avoidance (CSMA/CA) procedure. Other types of access schemes may be used in other examples. More generally, a device (e.g., an AP or a STA) having data for transmission senses the wireless communication medium to determine if the channel is already occupied. If the device senses the channel is idle, the device may transmit its data. Otherwise, the device may defer for some period before determining again whether or not the wireless communication medium is free for transmission. A method for performing a CSMA/CA procedure may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where the SIFS is shorter than the PIFS, which is shorter than the DIFS. Transmissions following a shorter time duration will have a higher priority than a transmission that must wait longer before attempting to access the channel.

Some wireless communication systems (e.g., based on IEEE 802.11ax) employ a target wait time (TWT) mechanism that schedules STAs to transmit or receive on a wireless communication medium at certain times. This allows a STA to switch to a low power mode when the STA is not actively transmitting or receiving information. Thus, the STA may save power (outside of its scheduled transmit or receive times). In addition, the use of TWT scheduling may enable the BSS (e.g., an AP) to manage traffic more efficiently (e.g., by preventing communication collisions between STAs, by prioritizing traffic, and so on).

In some examples (e.g., if one or more of the STAs 106e and 106f are out of the range of the AP 104 or otherwise have difficulty communicating with the AP 104), a STA 106d may be configured as a relay device. For example, the STA 106d may be configured (e.g., with STA and AP functionality) to relay communication between the AP 104 and the STA 106e and relays communication between the AP 104 and the STA 106f.

In some implementations, a wireless communication network might not have a central AP 104, but rather may function as a peer-to-peer network between the STAs 106. Accordingly, the functions of the AP 104 described herein may be performed by one or more of the STAs 106 in some examples. Also, in some examples, a STA may connect to a network served by an AP and also establish a peer-to-peer network with another STA.

For example, the STA 106b may communicate with the STA 106c via signaling 114 to form a peer-to-peer network. In this case, the STAs 106b and 106c may be referred to as a peer STAs. In some examples, the communication between the STAs 106b and 106c may operate pursuant to a wireless communication standard (e.g., the IEEE 802.11 standard or some other standard). For example, a first peer STA that has data to transmit to a second peer STA may perform a CSMA/CA procedure to gain access to a channel. In addition, the peer STAs may transmit data units that conform to the 802.11 standard (e.g., the data units include headers and payloads that conform to a specific version of the standard).

Access points in a network may communicate with one or more network entities (represented, for convenience, by network entities 112 in FIG. 1), including each other, to facilitate wide area network connectivity. A network entity may take various forms such as, for example, one or more radio and/or core network entities. Thus, in various implementations the network entities 112 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

FIG. 2 illustrates several components of an apparatus (e.g., a wireless communication device) 202 that may be deployed within the wireless communication system 100. The apparatus 202 is an example of a device that may be configured to implement the various methods described herein. For example, the apparatus 202 may be implemented as the AP 104, a relay (e.g., the STA 106d), or one of the other STAs 106 of FIG. 1.

The apparatus 202 may include a processing system 204 that controls operation of the apparatus 202. The processing system 204 may also be referred to as a central processing unit (CPU). A memory component 206 (e.g., including at least one memory device), which may include both read-only memory (ROM) and random access memory (RAM), provides instructions and data to the processing system 204. A portion of the memory component 206 may also include non-volatile random access memory (NVRAM). The processing system 204 typically performs logical and arithmetic operations based on program instructions stored within the memory component 206. The instructions in the memory component 206 may be executable to implement the methods described herein. In some aspects, the processing system 204 and the memory component 206 of FIG. 2 may correspond to the processing system 1314 of FIG. 13. In some aspects, the processing system 204 and the memory component 206 of FIG. 2 may correspond to the processing system 1514 of FIG. 15.

When the apparatus 202 is implemented or used as a transmitting node, the processing system 204 may be configured to select one of a plurality of medium access control (MAC) header types, and to generate a packet having that MAC header type. For example, the processing system 204 may be configured to generate a packet including a MAC header and a payload and to determine what type of MAC header to use.

When the apparatus 202 is implemented or used as a receiving node, the processing system 204 may be configured to process packets of a plurality of different MAC header types. For example, the processing system 204 may be configured to determine the type of MAC header used in a packet and process the packet and/or fields of the MAC header.

The processing system 204 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 204 to perform the various functions described herein.

The apparatus 202 may also include a housing that may include a transmitter 210 and a receiver 212 to allow transmission and reception of data between the apparatus 202 and a remote location. The transmitter 210 and receiver 212 may be combined into single communication device (e.g., a transceiver 214). In some implementations (e.g., where the transceiver 214 is an RF transceiver), an antenna 216 may be attached to the housing and electrically coupled to the transceiver 214. The apparatus 202 may also include (not shown) multiple transmitters, multiple receivers, multiple transceivers, and/or multiple antennas. The transmitter 210 and the receiver 212 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 210 may be configured to wirelessly transmit packets according to one or more MAC header types (e.g., corresponding to different versions of the 802.11 standard). For example, the transmitter 210 may be configured to transmit packets with the type of header generated by the processing system 204, discussed above.

The receiver 212 may be configured to wirelessly receive packets having one or more MAC header types. In some aspects, the receiver 212 is configured to detect a particular type of a MAC header and process the packet accordingly.

The receiver 212 may be used to detect and quantify the level of signals received by the transceiver 214. The receiver 212 may detect such signals as total energy, energy per subcarrier per symbol, power spectral density, or in some other manner. The apparatus 202 may also include a digital signal processor (DSP) 220 for use in processing signals. In some examples, the DSP 220 may be configured to generate a data unit for transmission. In some aspects, the data unit may include (e.g., may be) a physical layer data unit (PPDU). In some aspects, a PPDU may be referred to as a packet.

The apparatus 202 may further include an interface 222. In examples where the interface 222 is a user interface, the interface 222 may include (e.g., may be) a keypad, a microphone, a speaker, a display, and/or the like. Such a user interface may include any element or component that conveys information to a user of the apparatus 202 and/or receives input from the user.

The various components of the apparatus 202 may be coupled together by a bus system 226. The bus system 226 may include a data bus, for example, as well as a power bus, a control signal bus, and a status signal bus in addition to the data bus. Those of skill in the art will appreciate the components of the apparatus 202 may be coupled together or accept or provide inputs to each other using some other mechanism.

In some examples, the apparatus 202 may be an integrated circuit. In some examples, the apparatus 202 may be configured to operate in a wireless node (e.g., an AP or a STA) and to perform one or more of the operations described herein.

In some implementations, the apparatus 202 communicates with at least one other apparatus (not shown) via the interface 222. To this end, in some implementations, the interface 222 (e.g., a send/receive interface) may be coupled to the processing system 204 for outputting and/or obtaining (e.g., sending and/or receiving) information (e.g., received information, generated information, decoded information, messages, etc.) between the processing system 204 and the other apparatus. In some implementations, the interface 222 may include an interface bus, bus drivers, bus receivers, other suitable circuitry, or a combination thereof. In some implementations, the interface 222 may include radio frequency (RF) circuitry (e.g., an RF transmitter and/or an RF receiver).

Thus, the apparatus 202 may communicate with other apparatuses in various ways. In some examples, the apparatus may transmit and receive information (e.g., a frame, a message, bits, etc.) via RF signaling. In some cases, rather than transmitting information via RF signaling, the apparatus 202 may use the interface 222 to provide (e.g., output, send, transmit, etc.) information for RF transmission. For example, the processing system 204 may output information, via a bus interface, to an RF front end for RF transmission. Similarly, rather than receiving information via RF signaling, the apparatus 202 may use the interface 222 to obtain information that is received by another apparatus. For example, the processing system 204 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Although a number of separate components are illustrated in FIG. 2, one or more of the components may be combined or commonly implemented. For example, the processing system 204 may be used to implement not only the functionality described above with respect to the processing system 204, but also to implement the functionality described above with respect to the transceiver 214 and/or the DSP 220. Each of the components illustrated in FIG. 2 may be implemented using a plurality of separate elements. Furthermore, the processing system 204 may be used to implement any of the components, modules, circuits, or the like described below, or each may be implemented using a plurality of separate elements.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 2 may be implemented by processor and memory component(s) of the apparatus (e.g., by execution of appropriate code and/or by appropriate configuration of processor components). It should be appreciated that these components may be implemented in different types of apparatuses in different implementations (e.g., in an application-specific integrated circuit (ASIC), in a system-on-a-chip (SoC), etc.).

A device (e.g., the apparatus 202) operating in the wireless communication system 100 may implement only functionality of a transmitting node, only functionality of a receiving node, or functionality of both a transmitting node and a receive node. For ease of reference, when discussing the apparatus 202 operating as a transmitting node, it may be hereinafter referred to as an apparatus 202t. Similarly, when discussing the apparatus 202 operating as a receiving node, it may be hereinafter referred to as an apparatus 202r.

Figure 3:
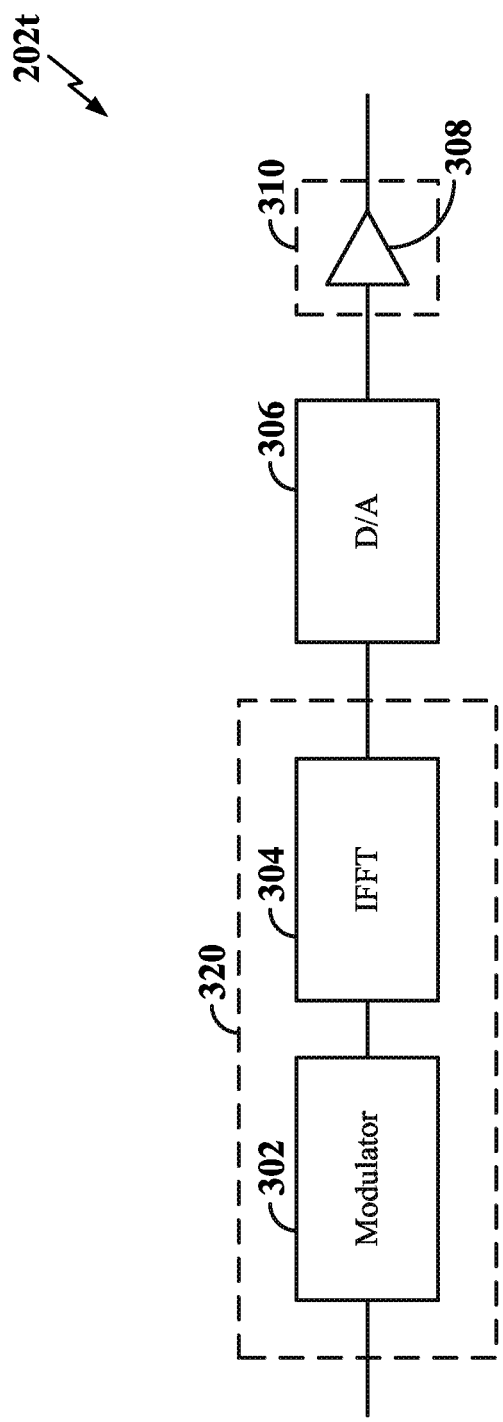
FIG. 3 is a block diagram of example components of the apparatus of FIG. 2 that may be used to transmit wireless communication signals according to some aspects.

FIG. 3 illustrates various components that may be utilized in the apparatus 202t to transmit wireless communication. The components illustrated in FIG. 3 may be used, for example, to transmit OFDM communication. In some examples, the components illustrated in FIG. 3 are used to generate and transmit packets to be sent over a bandwidth of less than or equal to 1 megahertz (MHz). In some examples, the components illustrated in FIG. 3 are used to generate and transmit packets to be sent over a bandwidth of greater than or equal to 1 MHz.

The apparatus 202t of FIG. 3 may include a modulator 302 configured to modulate bits for transmission. For example, the modulator 302 may determine a plurality of symbols from bits received from the processing system 204 (FIG. 2) or the interface 222 (FIG. 2), for example by mapping bits to a plurality of symbols according to a constellation. The bits may correspond to user data or to control information. In some aspects, the bits are received in codewords. In one example, the modulator 302 may include (e.g., may be) a QAM (quadrature amplitude modulation) modulator, for example, a 16-QAM modulator or a 64-QAM modulator. In other examples, the modulator 302 may include (e.g., may be) a binary phase-shift keying (BPSK) modulator, a quadrature phase-shift keying (QPSK) modulator, or an 8-PSK modulator. Other types of modulators may be used in other examples.

The apparatus 202t may further include a transform module 304 configured to convert symbols or otherwise modulated bits from the modulator 302 into a time domain. In FIG. 3, the transform module 304 is illustrated as being implemented by an inverse fast Fourier transform (IFFT) module. Other types of transform modules may be used in other examples. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 24 points are used to convert symbols being transmitted over 24 tones into a time domain The number of points used by the transform module 304 may be referred to as the size of the transform module 304.

In FIG. 3, the modulator 302 and the transform module 304 are illustrated as being implemented in a DSP 320. In some examples, however, one or both of the modulator 302 and the transform module 304 may be implemented in the processing system 204 of FIG. 2 or in another element of the apparatus 202*t*.

As discussed above, the DSP 320 may be configured to generate a data unit for transmission. In some aspects, the modulator 302 and the transform module 304 may be configured to generate a data unit including a plurality of fields including control information and a plurality of data symbols.

The apparatus 202*t* may further include a digital to analog converter (D/A) 306 configured to convert the output of the transform module into an analog signal. For example, the time-domain output of the transform module 304 may be converted to a baseband OFDM signal by the digital to analog converter 306. The digital to analog converter 306 may be implemented in the processing system 204 or in another element of the apparatus 202 of FIG. 2. In some aspects, the digital to analog converter 306 is implemented in the transceiver 214 of FIG. 2 or in a data transmit processor.

The analog signal may be wirelessly transmitted by a transmitter 310. The analog signal may be further processed before being transmitted by the transmitter 310, for example by being filtered or by being upconverted to an intermediate or carrier frequency. In the example illustrated in FIG. 3, the transmitter 310 includes a transmit amplifier 308. Prior to being transmitted, the analog signal may be amplified by the transmit amplifier 308. In some examples, the amplifier 308 may include a low noise amplifier (LNA).

The transmitter 310 is configured to transmit one or more packets or data units in a wireless signal based on the analog input signal. The data units may be generated using the processing system 204 of FIG. 2 and/or the DSP 320, for example using the modulator 302 and the transform module 304 as discussed above. Data units that may be generated and transmitted as discussed above are described in additional detail herein.

Figure 4:
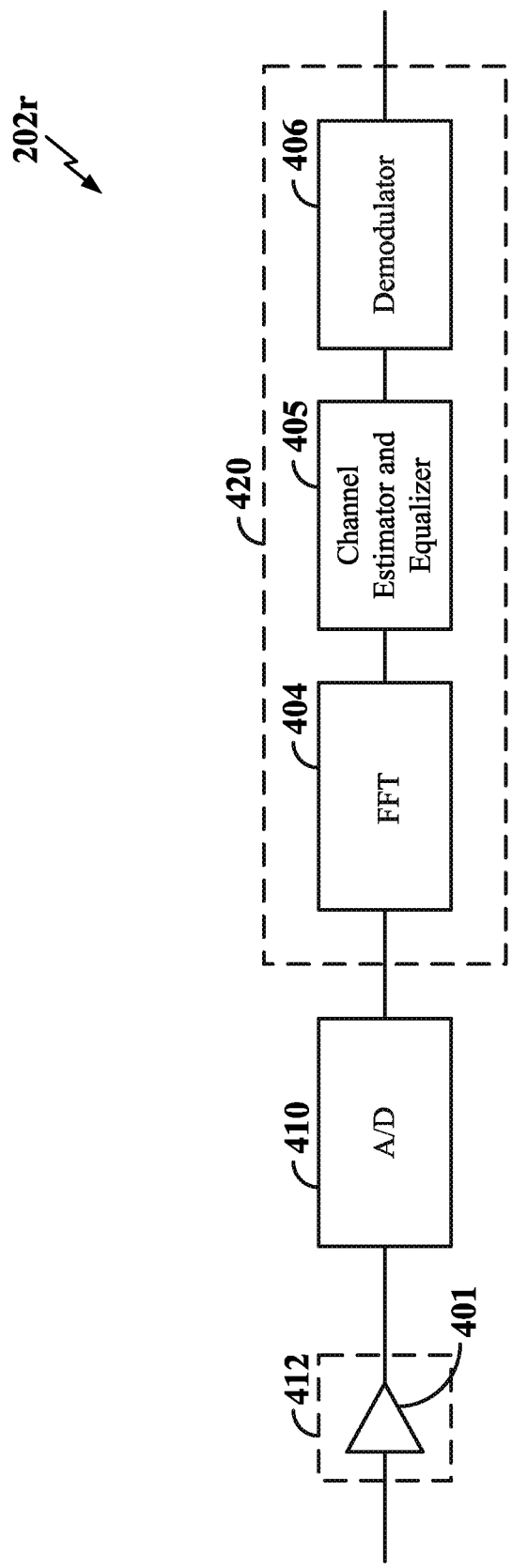
FIG. 4 is a block diagram of example components of the apparatus of FIG. 2 that may be used to receive wireless communication signals according to some aspects.

FIG. 4 illustrates various components that may be utilized in the apparatus 202*r* to receive wireless communication. The components illustrated in FIG. 4 may be used, for example, to receive OFDM communication. For example, the components illustrated in FIG. 4 may be used to receive data units transmitted by the components such as those discussed above with respect to FIG. 3.

A receiver 412 of apparatus 202*r* is configured to receive one or more packets or data units in a wireless signal. These data units may be received and decoded or otherwise processed as discussed below.

In the example illustrated in FIG. 4, the receiver 412 includes a receive amplifier 401. The receive amplifier 401 may be configured to amplify the wireless signal received by the receiver 412. In some examples, the receiver 412 is configured to adjust the gain of the receive amplifier 401 using an automatic gain control (AGC) function. In some aspects, the automatic gain control uses information in one or more training fields of a received data unit, such as a short training field (STF) for example, to adjust the gain. Those having ordinary skill in the art will understand methods for performing AGC. In some aspects, the amplifier 401 may include an LNA.

The apparatus 202*r* includes an analog to digital converter (A/D) 410 configured to convert the amplified wireless signal from the receiver 412 into a digital representation thereof. Further to being amplified, the wireless signal may be processed (e.g., by the receiver 412) before being converted by the analog to digital converter 410, for example by being filtered or by being downconverted to an intermediate or baseband frequency. The analog to digital converter 410 may be implemented in the processing system 204 of FIG. 2 or in another element of the apparatus 202*r*. In some examples, the analog to digital converter 410 is implemented in the transceiver 214 of FIG. 2 or in a data receive processor.

The apparatus 202*r* may further include a transform module 404 configured to convert the representation of the wireless signal into a frequency spectrum. In FIG. 4, the transform module 404 is illustrated as being implemented by a fast Fourier transform (FFT) module. In some aspects, the transform module 404 may identify a symbol for each point that it uses. As described above with reference to FIG. 3, the transform module 404 may be configured with a plurality of modes, and may use a different number of points to convert the signal in each mode. The number of points used by the transform module 404 may be referred to as the size of the transform module 404. In some aspects, the transform module 404 may identify a symbol for each point that it uses. Other types of transform modules may be used in other examples.

The apparatus 202*r* may further include a channel estimator and equalizer 405 configured to form an estimate of the channel over which the data unit is received, and to remove certain effects of the channel based on the channel estimate. For example, the channel estimator and equalizer 405 may be configured to approximate a function of the channel, and the channel equalizer may be configured to apply an inverse of that function to the data in the frequency spectrum.

The apparatus 202*r* may further include a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processing system 204 of FIG. 2, or used to display or otherwise output information to the interface 222 of FIG. 2. In this way, data and/or information may be decoded. In some aspects, the bits correspond to codewords. In one example, the demodulator 406 may include a QAM (quadrature amplitude modulation) demodulator, for example an 8-QAM demodulator or a 64-QAM demodulator. In other examples, the demodulator 406 may include a binary phase-shift keying (BPSK) demodulator or a quadrature phase-shift keying (QPSK) demodulator. Other types of demodulators may be used in other examples.

In FIG. 4, the transform module 404, the channel estimator and equalizer 405, and the demodulator 406 are illustrated as being implemented in the DSP 420. In some examples, however, one or more of the transform module 404, the channel estimator and equalizer 405, and the demodulator 406 may be implemented in the processing system 204 of FIG. 2 or in another element of the apparatus 202 of FIG. 2.

As discussed above, the wireless signal received at the receiver 212 may include one or more data units. Using the functions or components described above, the data units or data symbols therein may be decoded evaluated or otherwise evaluated or processed. For example, the processing system 204 of FIG. 2 and/or the DSP 420 may be used to decode data symbols in the data units using the transform module 404, the channel estimator and equalizer 405, and the demodulator 406.

The apparatus 202t shown in FIG. 3 is an example of a single transmit chain used for transmitting via an antenna. The apparatus 202r shown in FIG. 4 is an example of a single receive chain used for receiving via an antenna. In some implementations, the apparatus 202t or 202r may implement a portion of a multiple-input multiple-output (MIMO) system that uses multiple antennas to simultaneously transmit data via multiple streams and/or receive simultaneously transmit data via multiple streams.

Figure 5:
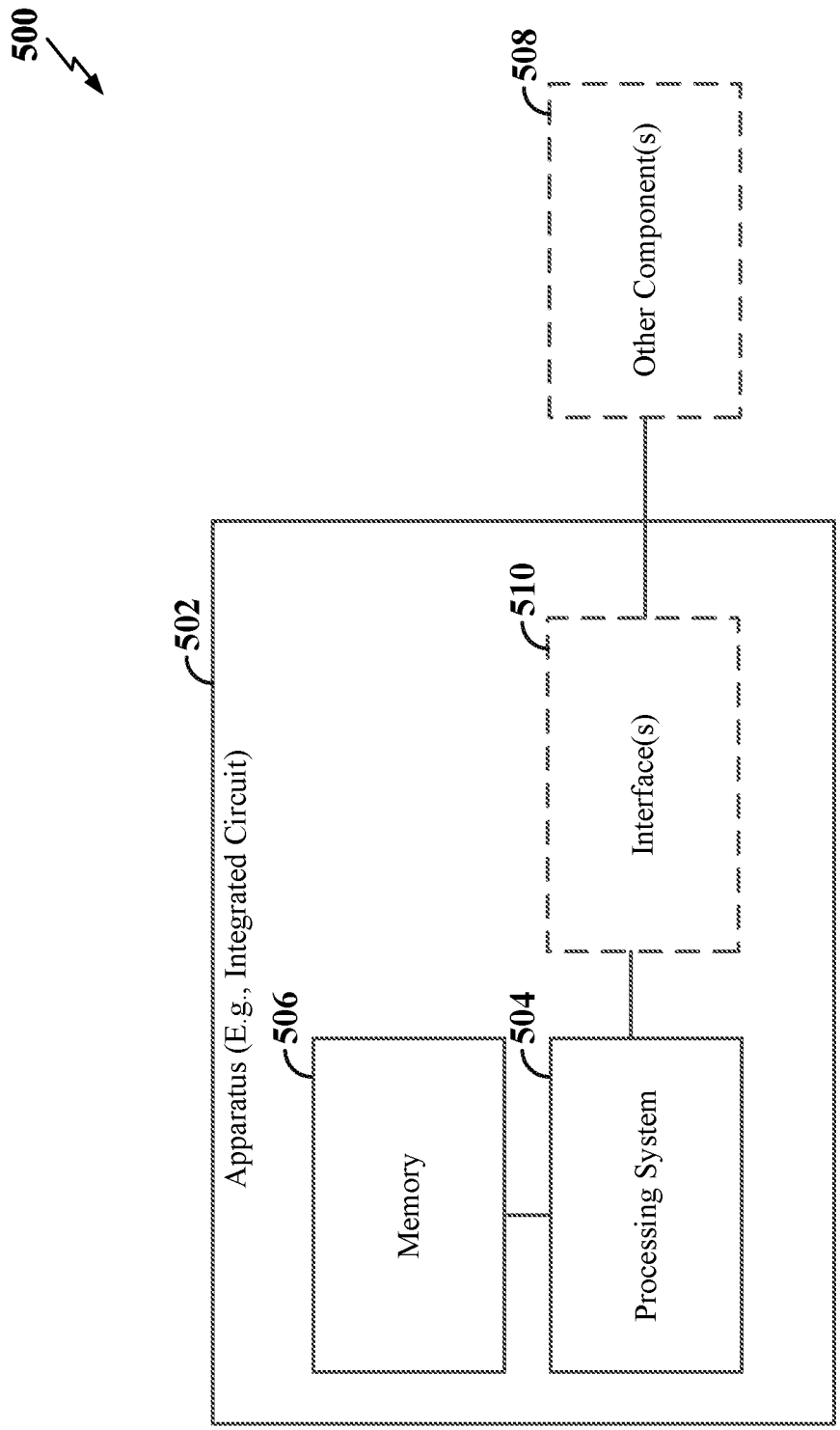
FIG. 5 is a block diagram of an example of an apparatus (e.g., an integrated circuit) according to some aspects.

FIG. 5 illustrates an example apparatus 500 according to certain aspects of the disclosure. In some examples, the apparatus 500 may be an AP, an AT, or some other type of wireless node (e.g., a wireless communication device). The apparatus 500 includes an apparatus 502 (e.g., an integrated circuit) and, optionally, at least one other component 508. In some examples, the apparatus 502 may be configured to operate in a wireless node (e.g., an AP or an AT) and to perform one or more of the operations described herein. The apparatus 502 includes a processing system 504, and a memory 506 coupled to the processing system 504. Example implementations of the processing system 504 are provided herein. In some aspects, the processing system 504 and the memory 506 of FIG. 5 may correspond to the processing system 1314 of FIG. 13. In some aspects, the processing system 504 and the memory 506 of FIG. 5 may correspond to the processing system 1614 of FIG. 16.

The processing system 504 is generally adapted for processing, including the execution of such programming stored on the memory 506. For example, the memory 506 may store instructions that, when executed by the processing system 504, cause the processing system 504 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 502 communicates with another component 508 (i.e., a component external to the apparatus 502) of the apparatus 500. To this end, the apparatus 502 may include a send/receive interface 510 (e.g., an interface bus, bus drivers, bus receivers, or other suitable circuitry) coupled to the processing system 504 for sending information (e.g., received information, decoded information, messages, etc.) between the processing system 504 and the other component 508. In some implementations, the interface 510 may be configured to interface the processing system 504 to one or more other components (e.g., a radio frequency (RF) front end (e.g., a transmitter and/or a receiver)) of the apparatus 500 (other components not shown in FIG. 5).

The apparatus 502 may communicate with other apparatuses in various ways. In cases where the apparatus 502 include an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface (e.g., the interface 510), to an RF front end for RF transmission. Similarly, rather than receiving information via RF signaling, the apparatus 502 may have an interface (e.g., the interface 510) to obtain information that is received by another apparatus. For example, the processing system 504 may obtain (e.g., receive) information, via a bus interface, from an RF receiver that received the information via RF signaling.

Figure 6:
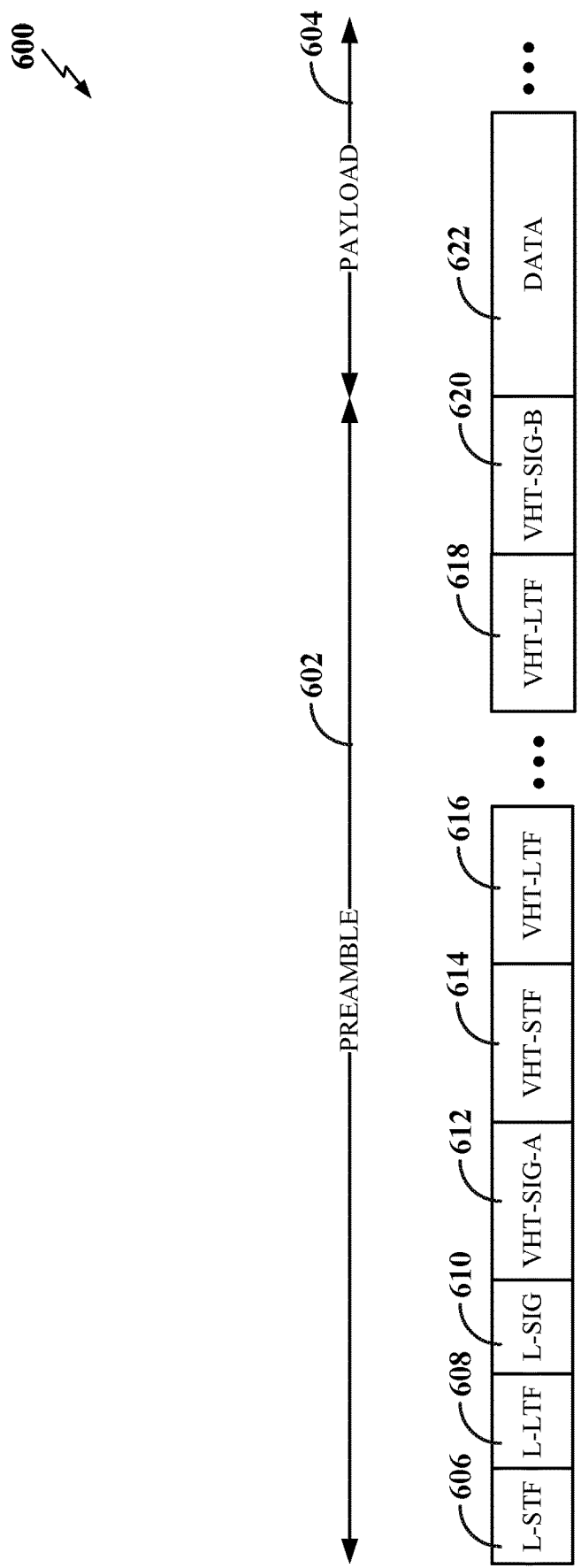
FIG. 6 is a conceptual illustration of an example of a packet according to some aspects.

As mentioned above, an apparatus may communicate information using a data unit. FIG. 6 illustrates an example of a data unit 600 that includes a preamble 602 and a payload 604. As discussed in more detail below, the preamble 602 may include automatic gain control information, synchronization information, and channel estimation information, while the payload 604 may include data.

A data unit may take different forms in different implementations. In some examples, a data unit may be a frame for wireless communication. In some examples, a data unit may be a Physical Layer Convergence Protocol (PLCP) Protocol Data Unit (PPDU) for Wi-Fi communication. In some examples, a data unit may be an IEEE 802.11 frame (e.g., an IEEE 802.11ac frame, an IEEE 802.11ax frame, etc.). Other examples of data units for wireless communication are possible.

In the example of FIG. 6, the preamble 602 of the data unit 600 includes a legacy short training field (L-STF), 606, a legacy long training field (L-LTF) 608, a legacy signal field (L-SIG) 610, a very high throughput (VHT) signal field A (VHT-SIG-A) 612, a VHT-STF 614, multiple VHT-long training fields (VHT-LTFs) 616 through 618, and a VHT signal field B (VHT-SIG-B) 620. The payload 604 of the data unit 600 includes a data field 622. Other fields may be used in other examples (e.g., other versions of IEEE 802.11).

The wireless communication standard IEEE 802.11n defines a non-high throughput (Non-HT) duplicate transmission. In a Non-HT duplicate transmission, the L-STF, L-LTF, and L-SIG fields of the packet are transmitted in the same way as in a VHT transmission. However, the VHT-SIG-A, VHT-STF, VHT-LTF, and VHT-SIG-B fields are not transmitted. A Non-HT duplicate transmission may be used, for example, to transmit to Non-HT OFDM STAs, HT STAs, or VHT STAs that may be operating in a part of a 40 MHz, 80 MHz, 160 MHz, or 320 MHz channel.

Figure 7:
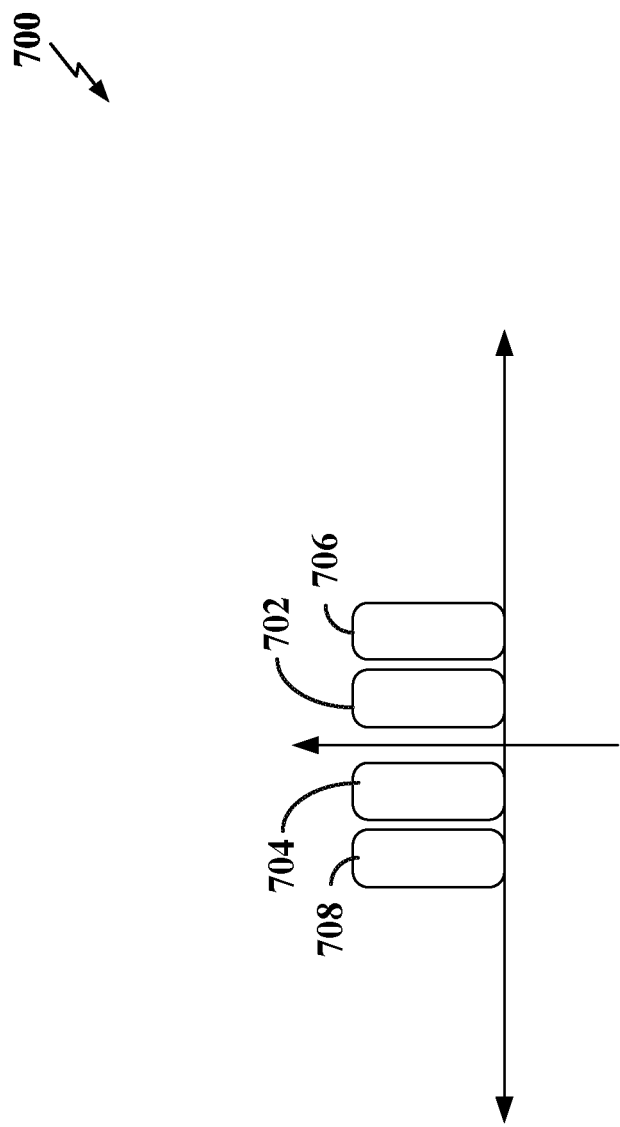
FIG. 7 is a conceptual illustration of an example of radio frequency sub-bands according to some aspects.

In some examples, the data transmission of a Non-HT duplicate transmission duplicates the transmission of a 20 MHz IEEE 802.11a signal over every 20 MHz frequency segment (sub-band). For example, an 80 MHz Non-HT transmission may consist of four 20 MHz IEEE 802.11a signals placed next to each other. As shown in the example 700 of FIG. 7, an 80 MHz carrier bandwidth (CBW) may include a first 20 MHz sub-band 702, a second 20 MHz sub-band 704, a third 20 MHz sub-band 706, and a fourth 20 MHz sub-band 708.

In some examples, a different phase rotation is applied to each 20 MHz segment (e.g., ±90 degrees, 180 degrees) to reduce the peak-to-average power ratio (PAPR) of the transmitted signal caused by the repetition across sub-bands. For example, no phase rotation may be applied to the first 20

MHz sub-band 702, a +90 degrees phase rotation may be applied to the second 20 MHz sub-band 704, a −90 degrees phase rotation may be applied to the third 20 MHz sub-band 706, and a 180 degrees phase rotation may be applied to the fourth 20 MHz sub-band 708.

An access point (AP) may use a relatively significant amount of resources (e.g., several analog receive chains) and physical layer (PHY) signal processing to improve the range of transmission and data packet reception when communicating with one or more STAs. Here, the communication from a STA to the AP (e.g., an uplink) may be a significant limiting factor in the range of the communication since a STA may use a lower transmit power than the AP. It should be appreciated that this issue may occur in other scenarios (e.g., not necessarily an uplink scenario) where one device has a lower transmit power than other device.

Figure 8:
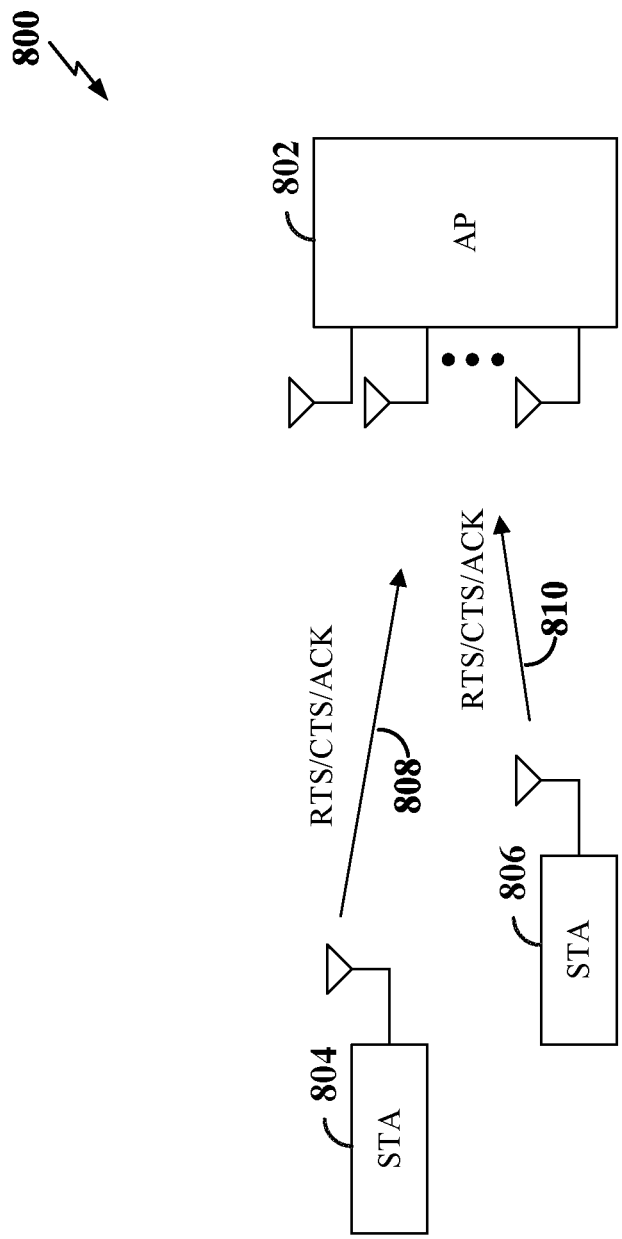
FIG. 8 is a block diagram of an example of a wireless communication system according to some aspects.

FIG. 8 illustrates an example a wireless communication system 800 where an AP 802 communicates with a first STA 804 and a second STA 806. In some examples, the AP 802 may correspond to any of the APs or other apparatuses described in any of FIGS. 1, 2, 5, 13, and 16. In some examples, the STAs 804 and 806 may correspond to any of the STAs or other apparatuses described in any of FIGS. 1, 2, 5, 13, and 16.

Figure 9:
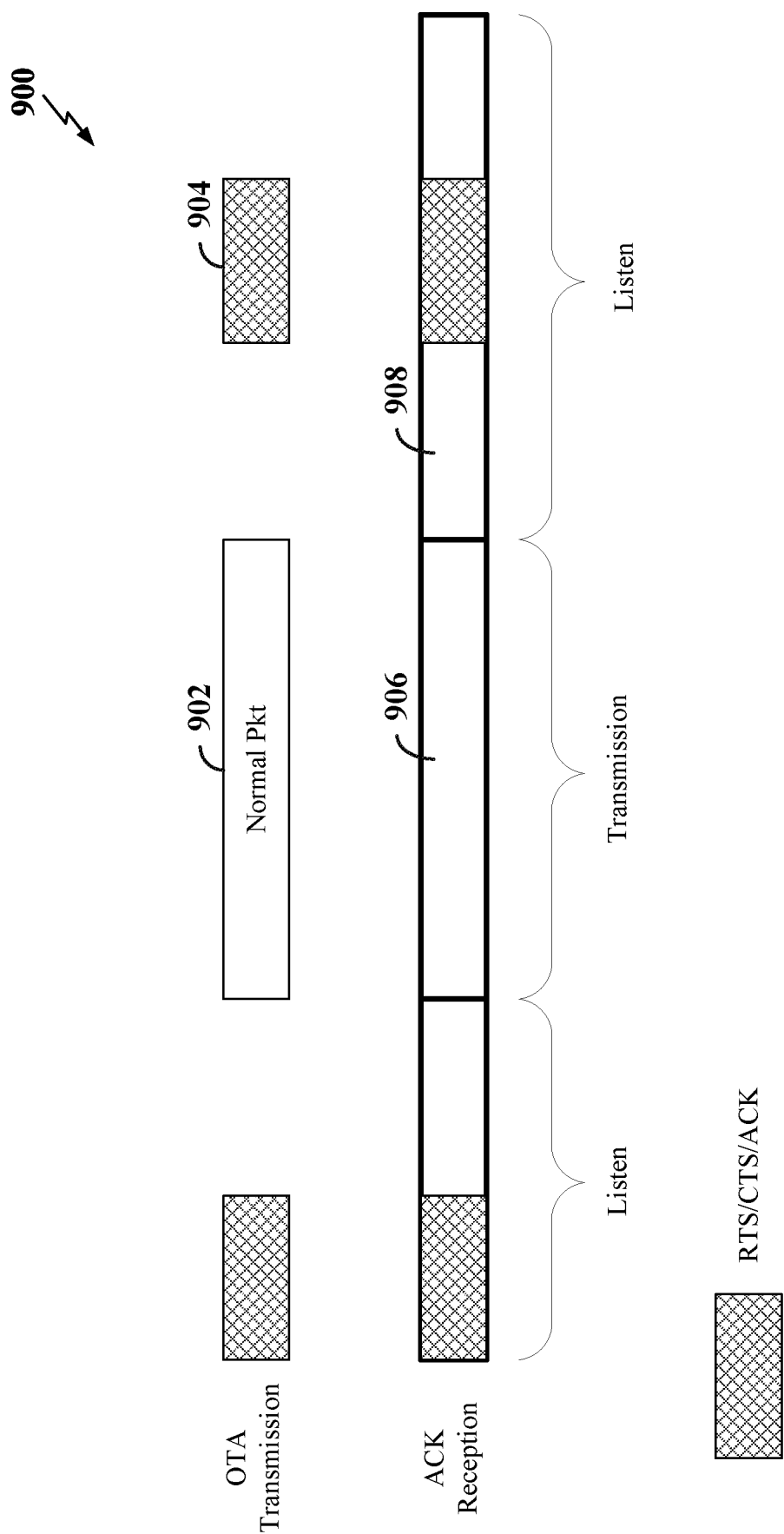
FIG. 9 is a conceptual diagram of an example of signaling in the wireless communication system of FIG. 8 according to some aspects.

FIG. 9 illustrates an example of a signaling diagram 900 that includes transmission and reception periods that may be used by the wireless communication system 800 of FIG. 8. For example, a first device (e.g., the STA 804 of FIG. 8) may receive a packet during a period 902 and transmit a request-to-send (RTS), a clear-to-send (CTS), or an acknowledgement (ACK) during the period 904. In addition, a second device (e.g., the AP 802 of FIG. 8) may transmit during a period 906 and monitor for transmissions from other devices during a period 908.

Referring again to FIG. 8, in some examples (e.g., when the carrier bandwidth is greater than or equal to 40 MHz), the STA 804 and the STA 806 may transmit a request-to-send (RTS), clear-to-send (CTS), or acknowledgement (ACK) frame 808 or 810, respectively, in a Non-HT duplicate mode. In some aspects, this may exacerbate the problem the AP 802 has with respect to receiving uplink packets.

Figure 10:
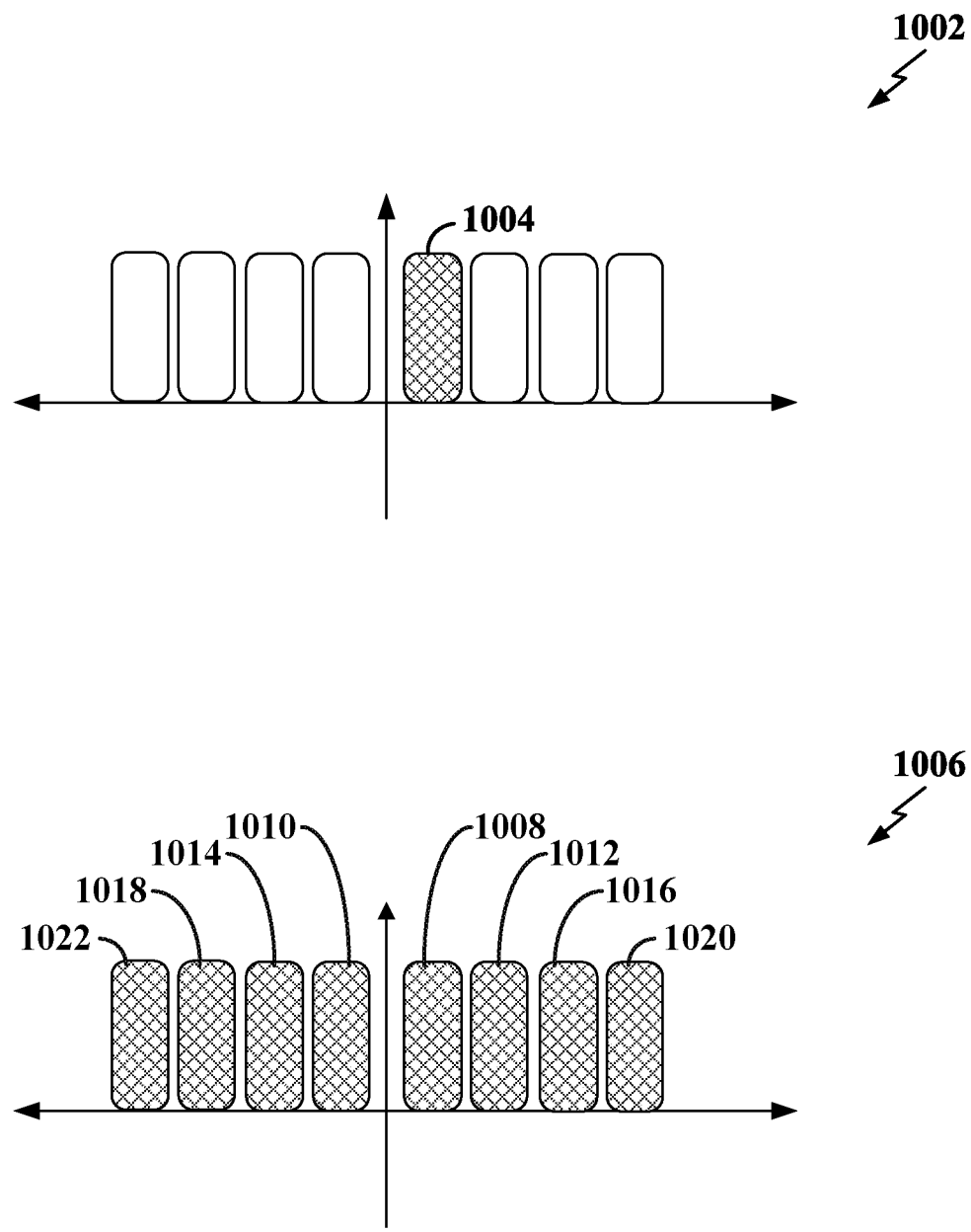
FIG. 10 is a conceptual illustration of examples of radio frequency sub-bands used for reception according to some aspects.

As mentioned above, Non-HT duplicate transmission may involve duplicating the data transmission over multiple sub-bands. However, in some wireless communication systems, the Non-HT duplicate packets are detected and decoded using only the energy in the primary 20 MHz sub-band. For example, FIG. 10 illustrates a first CBW 1002 where only the first sub-band 1004 is used for packet detection. In some aspects, this technique wastes the energy transmitted in the other sub-bands since the energy in these other sub-bands is not used for packet detection.

The disclosure relates in some aspects to using repetition in the frequency domain for the reception of RTS packets, CTS packets, ACK packets, and other types of packets. In some aspects, the use of such repetition may improve Non-HT duplicate transmission detection performance at a receiving device. For example, when receiving a Non-HT duplicate transmission, the receiving device may combine the time domain and frequency domain blocks up to the expected bandwidth.

As discussed above, a wireless local area network (WLAN) packet (e.g., an 802.11 packet) may start with a preamble, where the Legacy-STF is the first part of the preamble of every WLAN packet. In some examples, the L-STF has 0.8 µs signal repeated 10 times over 8 µs, to enable a receiving device to perform automatic gain control (AGC) in a specified received signal strength indication (RSSI) range (e.g., −100 to 20 dBm). The Legacy-LTF is the second part of the preamble and is used for time synchronization. For Non-HT duplicated packets, the L-STF and L-LTF may be repeated over sub-bands (e.g., 16 sub-bands for a 320 MHz CBW).

Thus, instead of using only the primary 20 MHz sub-band and performing autocorrelation (e.g., 8 µs for a lower RSSI or 1.6 us for a higher RSSI) to detect an OFDM signal, the entire PPDU bandwidth (PBW) may be used for the AGC, packet detection, and timing synchronization operations. For example, FIG. 10 illustrates a second CBW 1006 where a first sub-band 1008, a second sub-band 1010, a third sub-band 1012, a fourth sub-band 1014, a fifth sub-band 1016, a sixth sub-band 1018, a seventh sub-band 1020, and an eight sub-band 1022 are used for packet detection.

In some examples, instead of doing the STF packet detection over the entire PBW (e.g., 320 MHz), short training field (STF) and long training field (LTF) detection may be performed over a subset of the CBW (e.g., 40 MHz) to reduce the hardware costs (e.g., the number of receive chains) used for the detection. For example, only the first sub-band 1008 and the second sub-band 1010 of FIG. 10 may be used for packet detection in such a case. Other sub-band combinations may be used in other examples.

Figure 11:
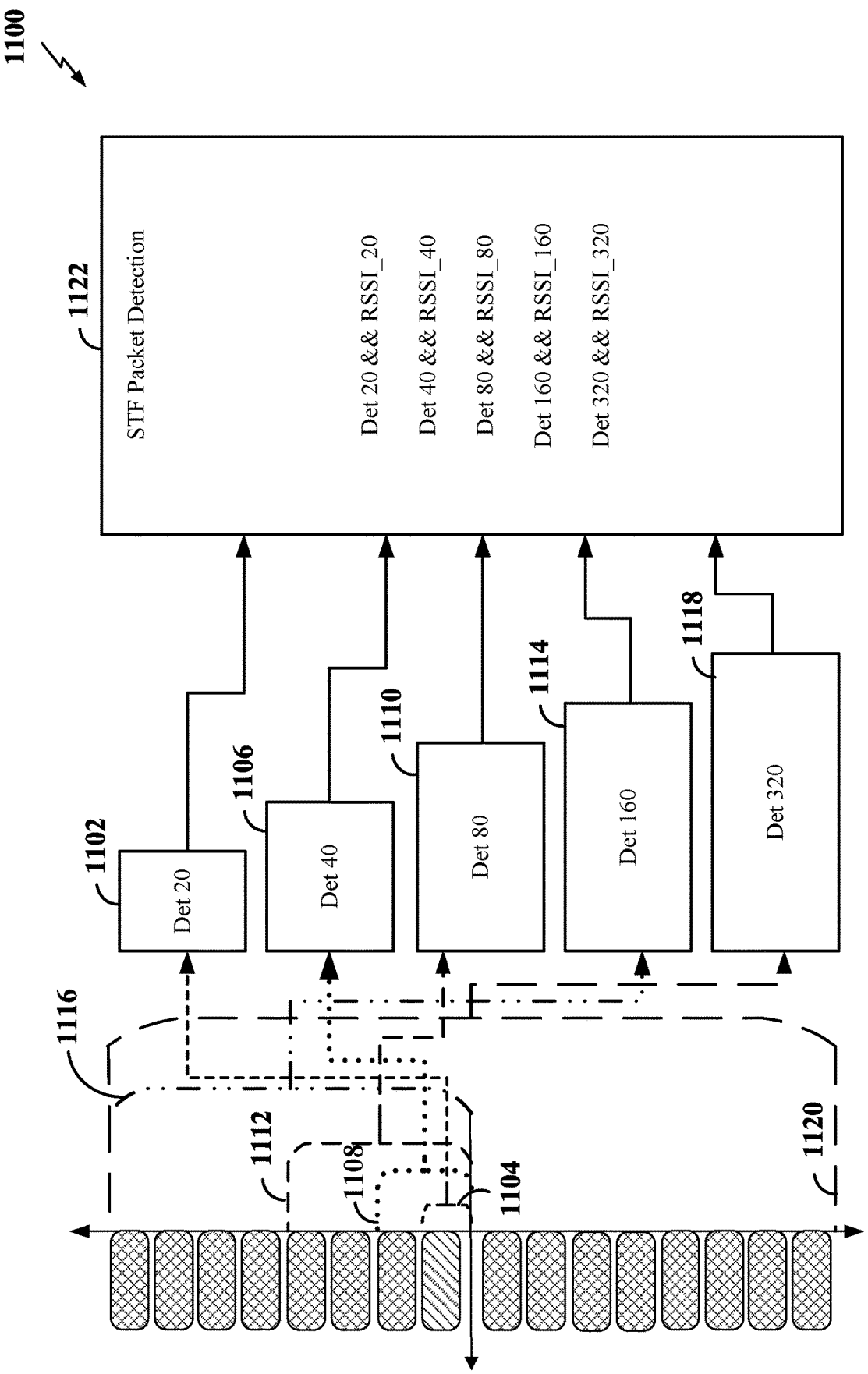
FIG. 11 is a block diagram of an example of signal detection for different radio frequency sub-bands according to some aspects.

FIG. 11 illustrates an example technique for STF packet detection. Here a first detector (Det 20) 1102 detects a 20 MHz sub-band 1104, a second detector (Det 40) 1106 detects a 40 MHz sub-band 1108, a third detector (Det 80) 1110 detects an 80 MHz sub-band 1112, a fourth detector (Det 160) 1114 detects a 160 MHz sub-band 1116, and a fifth detector (Det320) 1118 detects a 320 MHz sub-band 1120. The STF packet detection component 1122 may then compare the energy of the signal detected by the first detector 1102 with a first detection threshold (e.g., Det20 && rssi_20), or the energy of the signal detected by the second detector 1106 with a second detection threshold (e.g., Det40 && rssi_40), or the energy of the signal detected by the third detector 1110 with a third detection threshold (e.g., Det80 && rssi_80), or the energy of the signal detected by the fourth detector 1114 with a fourth detection threshold (e.g., Det160 && rssi_160), or the energy of the signal detected by the fifth detector 1118 with a fifth detection threshold (e.g., Det320 && rssi_320).

The detectors of FIG. 11 may run autocorrelation per chain and per sub-band and check RSSI (e.g., power over 800 nanoseconds (ns) for a given sub-band) condition. The RSSI condition checks the power level depending on the PBW to be detected. For example, for the second detector (Det 40) 1106, the RSSI combined for the primary 20 MHz bandwidth and an extended 20 MHz bandwidth may be used. If a given PBW is detected, the LTF detection is performed over the same PBW. Thus, the STF packet detection component 1122 may acquire signals over the appropriate bandwidth (e.g., based on the widest bandwidth where the detected energy exceeded the detection threshold).

Using the STF Packet detection component 1122, link range may be improved by 3/6/9/12 dB for PBW=40/80/160/320 in some examples. Here, multiple STF detectors may be deployed in parallel since a STA might send Non-HT duplicate packets where the PBW≤the CBW (e.g., depending upon hardware capability and channel occupancy). For example, a total of five detectors (e.g., for STF_20 or STF_Dup40 or STF_Dup80 or STF_Dup160 or STF_Dup320) may be running in parallel, which may increase the complexity for receiver time domain processing. To reduce this complexity, fewer detectors may be used in some examples. For example, a receiver may use two detectors (e.g., STF_20 or STF_Dup40) in the time domain but process the entire PBW in the frequency domain.

Figure 12:
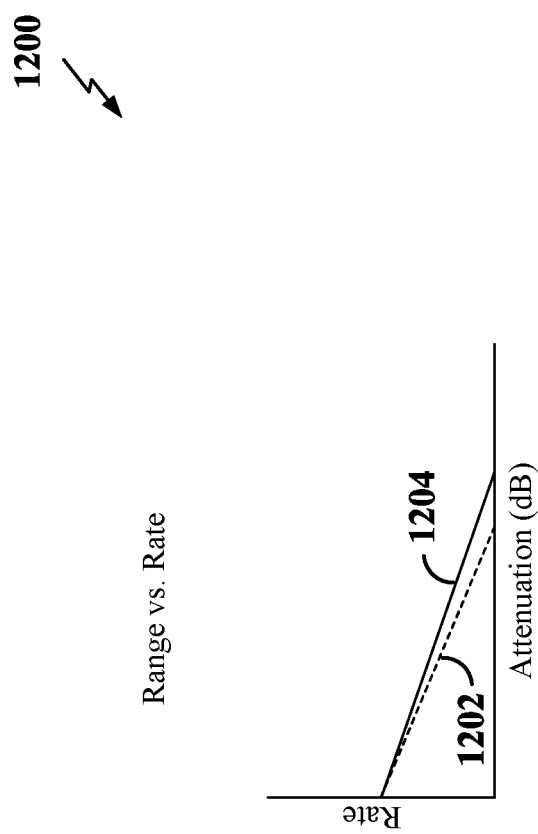
FIG. 12 is a graphical illustration of an example of communication performance according to some aspects.

FIG. 12 is a graph 1200 that illustrates a first example 1202 of range versus rate for a system that does not use duplication as taught herein and a second example 1204 of range versus rate for a system that uses duplication as taught herein. Here, it may be seen that using the techniques described herein, Non-HT duplicate packets can tolerate higher attenuation. Thus, a significant improvement in link range may be achieved.

For example, based on above, with a total of 16 sub-bands combining for a CBW of 320 MHz, the modulation and coding scheme 0 (MCS 0) performance may be improved by $10*\log 10(320/20)=12$ dB. Thus, the link range may be improved by 12 dB. Accordingly, ACK reception (e.g., 24 megabits per second (Mbps)) may be improved by 12 dB.

Figure 13:
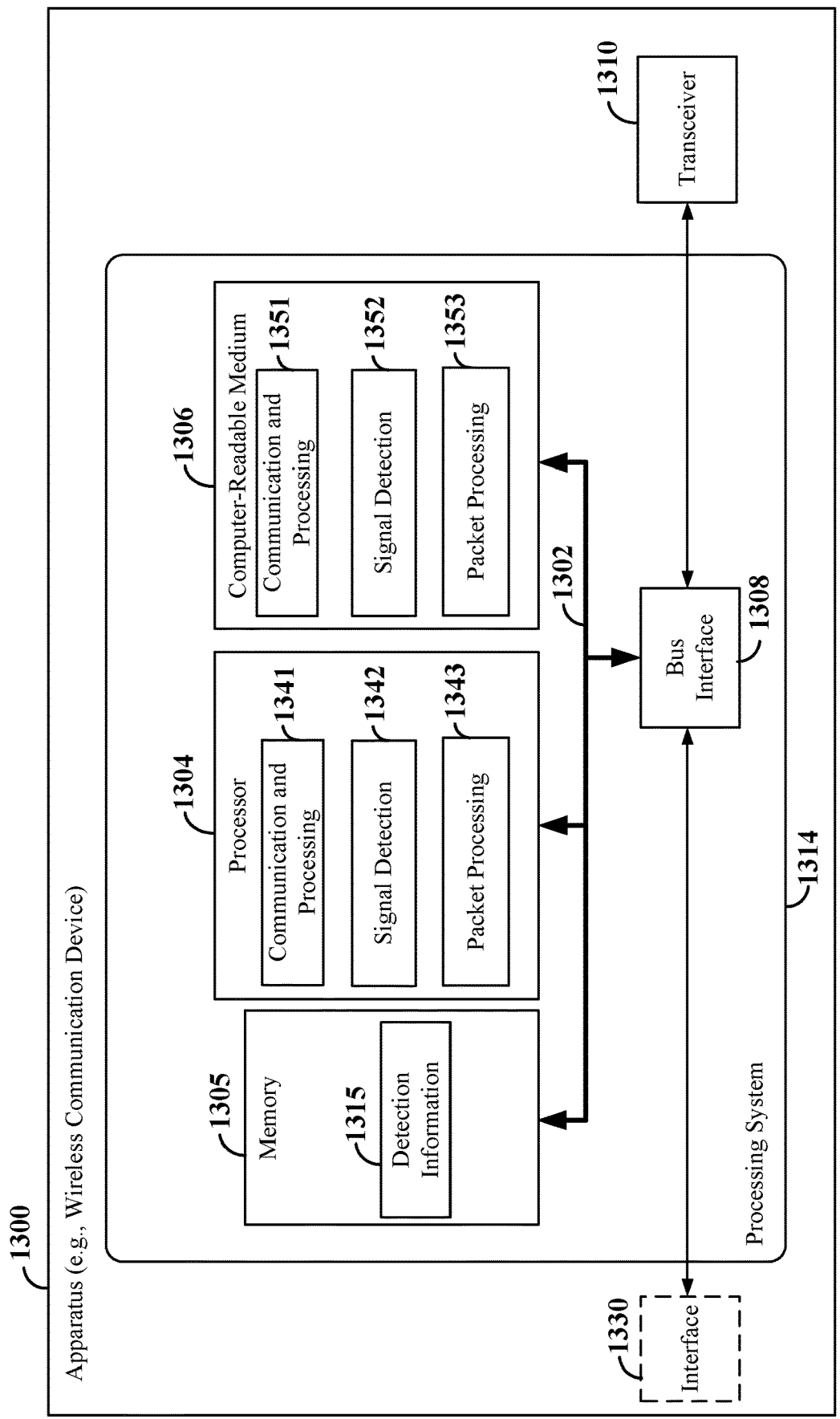
FIG. 13 is a block diagram conceptually illustrating an example of a hardware implementation for an apparatus (e.g., a wireless node such as a wireless communication device) employing a processing system according to some aspects.

FIG. 13 is a block diagram illustrating an example of a hardware implementation for an apparatus 1300 employing a processing system 1314. In some examples, the apparatus 1300 (e.g., an AP) may correspond to the AP 104 of FIG. 1. In some implementations, the apparatus 1300 may correspond to one or more of the STAs 106 of FIG. 1, the apparatus 202 of FIG. 2, the apparatus 500 or 502 of FIG. 5, or the STA 804, the STA 806, or the AP 802 of FIG. 8.

In accordance with various aspects of the disclosure, an element, or any portion of an element, or any combination of elements may be implemented with the processing system 1314 (e.g., that includes one or more processors 1304). Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in an apparatus 1300, may be used to implement any one or more of the processes and procedures described below.

The processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the apparatus 1300 or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store detection information 1315 (e.g., sub-band detection thresholds) used by the processor 1304 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1300 may be configured to perform any one or more of the operations described herein (e.g., as described above in conjunction with FIGS. 1-12 and as described below in conjunction with FIGS. 14 and 15). In some aspects of the disclosure, the processor 1304, as utilized in the apparatus 1300, may include circuitry configured for various functions.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for obtaining (e.g., obtaining information from another apparatus). In some examples, the communication and processing circuitry 1341 may include functionality for a means for receiving (e.g., receiving transmitted RF signals including information). In some examples, the communication and processing circuitry 1341 may include functionality for a means for decoding. In some examples, the communication and processing circuitry 1341 may include functionality for a means for receiving training field information and payload information.

In some implementations where the communication involves outputting (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for outputting (e.g., outputting data or other information to another apparatus). In some examples, the communication and processing circuitry 1341 may include functionality for a means for transmitting (e.g., transmitting data or other information via RF signals). In some examples, the communication and processing circuitry 1341 may include functionality for a means for encoding.

The processor 1304 may include signal detection circuitry 1342 configured to perform signal detection-related operations as discussed herein. The signal detection circuitry 1342 may be configured to execute signal detection software 1352 included on the computer-readable medium 1306 to implement one or more functions described herein.

The signal detection circuitry 1342 may include functionality for a means for obtaining a signal (e.g., a training field signal and/or a payload signal). For example, the signal detection circuitry 1342 may be configured to receive a packet from another apparatus (e.g., a STA or an AP).

The signal detection circuitry 1342 may include functionality for a means for obtaining training field information. For example, the signal detection circuitry 1342 may be configured to receive a packet from another apparatus (e.g., a STA or an AP) and decode the information fields of the packet to extract STF and LTF information.

The signal detection circuitry 1342 may include functionality for a means for obtaining payload data. For example, the signal detection circuitry 1342 may be configured to receive a packet from another apparatus (e.g., a STA or an AP) and decode the information fields of the packet to extract payload data. As another example, the signal detection circuitry 1342 may be configured to use synchronization information obtain the payload data.

The signal detection circuitry 1342 may include functionality for a means for detecting a packet. For example, the signal detection circuitry 1342 may be configured to measure signals on a channel to determine whether the received signal strength is greater than or equal to an energy detection threshold.

The signal detection circuitry 1342 may include functionality for a means for using a threshold. For example, the signal detection circuitry 1342 may be configured to measure signals on a channel to compare received signal strength to an energy detection threshold for a packet detection operation.

The signal detection circuitry 1342 may include functionality for a means for decoding information. For example, the signal detection circuitry 1342 may be configured to decode LTF information based on AGC information derived from an STF.

The signal detection circuitry 1342 may include functionality for a means for detecting signals (e.g., performing signal detection). For example, the signal detection circuitry 1342 may be configured to measure signals on a designated set of one or more RF sub-bands. As another example, the signal detection circuitry 1342 may be configured to training field signals over a designated packet bandwidth.

The processor 1304 may include packet processing circuitry 1343 configured to perform packet processing-related operations as discussed herein. The packet processing circuitry 1343 may be configured to execute packet processing software 1353 included on the computer-readable medium 1306 to implement one or more functions described herein.

The packet processing circuitry 1343 may include functionality for a means for combining information (e.g., payload data and/or training field information). For example, the packet processing circuitry 1343 may be configured to combine payload data that is duplicated on multiple sub-bands. As another example, the packet processing circuitry 1343 may be configured to combine STF information that is duplicated over multiple sub-bands.

The packet processing circuitry 1343 may include functionality for a means for outputting a combined signal (e.g., combined payload data). For example, the packet processing circuitry 1343 may be configured to provide payload information received from a second apparatus to another device (e.g., a processor) of the apparatus 1300.

The packet processing circuitry 1343 may include functionality for a means for obtaining a signal indicative of a protocol data unit bandwidth. For example, the packet processing circuitry 1343 may be configured to receive a message (e.g., a capability message) from another apparatus where the message indicates a protocol data unit bandwidth used by the other apparatus.

The packet processing circuitry 1343 may include functionality for a means for selecting a set of one or more RF sub-bands. For example, the packet processing circuitry 1343 may be configured to select a set of bands to be used for transmitting or receiving certain fields of a packet.

Figure 14:
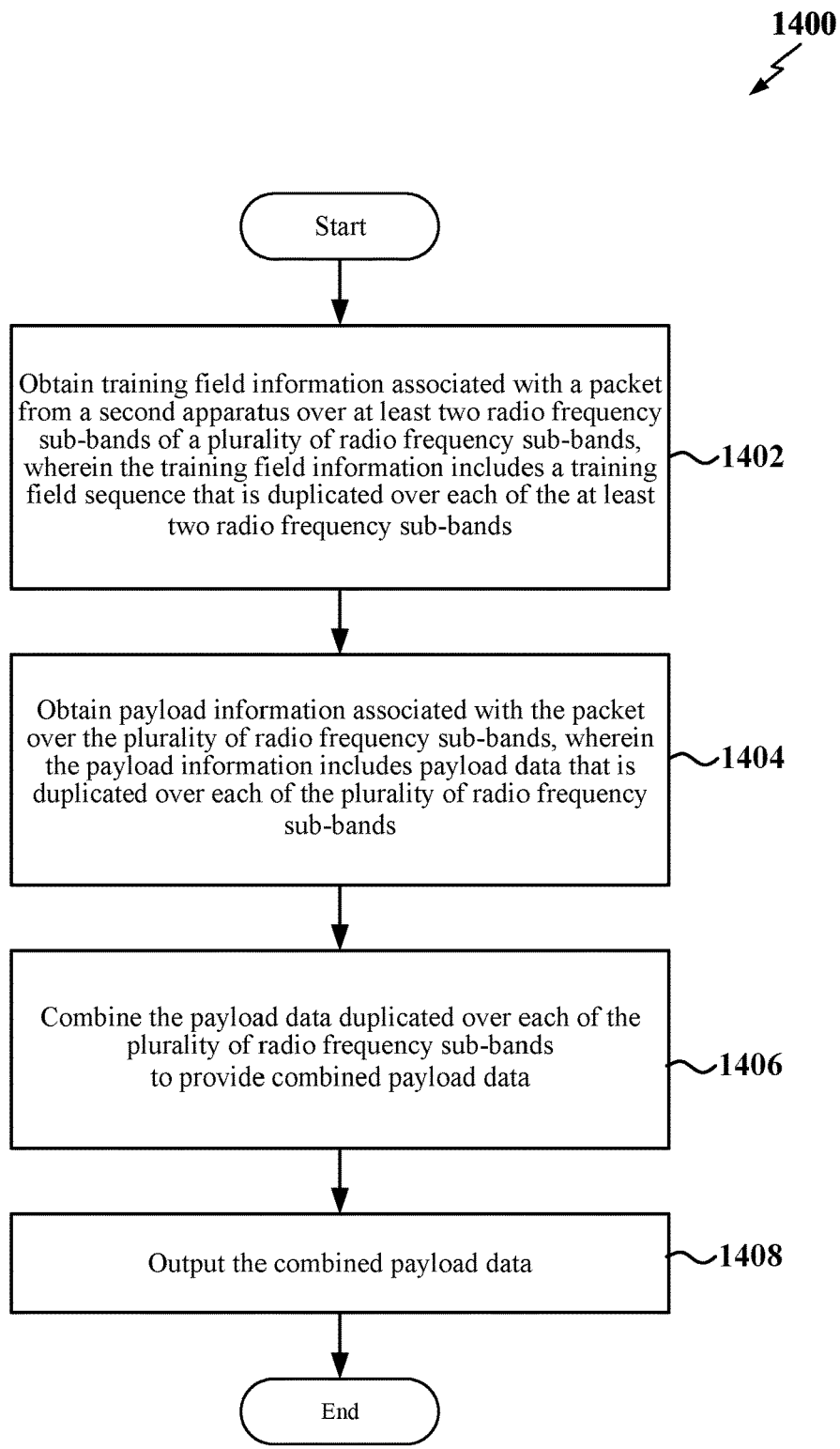
FIG. 14 is a flow chart illustrating an example communication method for obtaining packet information according to some aspects.

FIG. 14 is a flow chart illustrating an example method 1400 for communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1300 illustrated in FIG. 13. In some examples, the method 1400 may be carried out by the apparatus 502 illustrated in FIG. 5. In some examples, the method 1400 may be performed by an access point or a STA. In some examples, the method 1400 may be carried out by any suitable apparatus or means for carrying out the functions or algorithm described below.

At block 1402, a first apparatus may obtain training field information associated with a packet from a second apparatus over at least two radio frequency sub-bands of a plurality of radio frequency sub-bands, wherein the training field information includes a training field sequence that is duplicated over each of the at least two radio frequency sub-bands. For example, the signal detection circuitry 1342 in cooperation with the communication and processing circuitry 1341 and the transceiver 1310, shown and described above in connection with FIG. 13, may provide a means to obtain training field information associated with a packet from a second apparatus over at least two radio frequency sub-bands of a plurality of radio frequency sub-bands.

At block 1404, the first apparatus may obtain payload information associated with the packet over the plurality of radio frequency sub-bands, wherein the payload information includes payload data that is duplicated over each of the plurality of radio frequency sub-bands. For example, the signal detection circuitry 1342 in cooperation with the communication and processing circuitry 1341 and the transceiver 1310, shown and described above in connection with FIG. 13, may provide a means to obtain payload information associated with the packet over the plurality of radio frequency sub-bands.

At block 1406, the first apparatus may combine the payload data duplicated over each of the plurality of radio frequency sub-bands to provide combined payload data. For example, the packet processing circuitry 1343 in cooperation with the communication and processing circuitry 1341 and the transceiver 1310, shown and described above in connection with FIG. 13, may provide a means to combine the payload data duplicated over each of the plurality of radio frequency sub-bands to provide combined payload data.

At block 1408, the first apparatus may output the combined payload data. For example, the packet processing circuitry 1343 in cooperation with the communication and processing circuitry 1341 and the transceiver 1310, shown and described above in connection with FIG. 13, may provide a means to output the combined payload data.

In some examples, each radio frequency sub-band of the plurality of radio frequency sub-bands may include a 20 MHz bandwidth. In some examples, the at least two radio frequency sub-bands of the plurality of radio frequency sub-bands may include two radio frequency sub-bands, four radio frequency sub-bands, eight radio frequency sub-bands, or sixteen radio frequency sub-bands. In some examples, the at least two radio frequency sub-bands of the plurality of radio frequency sub-bands may include fewer radio frequency sub-bands than the plurality of radio frequency sub-bands.

In some examples, the first apparatus may detect the packet based on a threshold associated with how many radio frequency sub-bands are included in the at least two radio frequency sub-bands. In some examples, the first apparatus may use a first threshold for detecting the packet over two radio frequency sub-bands of the plurality of radio frequency sub-bands, use a second threshold different from the first threshold for detecting the packet over four radio frequency sub-bands of the plurality of radio frequency sub-bands, use a third threshold different from the first threshold for detecting the packet over eight radio frequency sub-bands of the plurality of radio frequency sub-bands, and use a fourth threshold different from the first threshold for detecting the packet over sixteen radio frequency sub-bands of the plurality of radio frequency sub-bands.

In some examples, the packet may be a request-to-send packet, a clear-to-send packet, or an acknowledgement packet. In some example, the first apparatus may output the packet independent of very high throughput (VHT) training field information and VHT signal information. In some examples, the payload information may include a request-to-send, a clear-to-send, or an acknowledgement. In some examples, the packet does not include very high throughput (VHT) training field information or VHT signal information.

In some examples, the training field information may include legacy short training field information and a legacy long training field information. In some examples, the first apparatus may combine the legacy short training field information duplicated over the at least two radio frequency sub-bands to obtain automatic gain control information. In some examples, the first apparatus may decode the legacy long training field information based on the automatic gain control information to obtain synchronization information. In some examples, the first apparatus may obtain the payload data based on the synchronization information.

In some examples, the first apparatus may receive the training field information and the payload information, wherein the first apparatus is configured as a wireless node.

Figure 15:
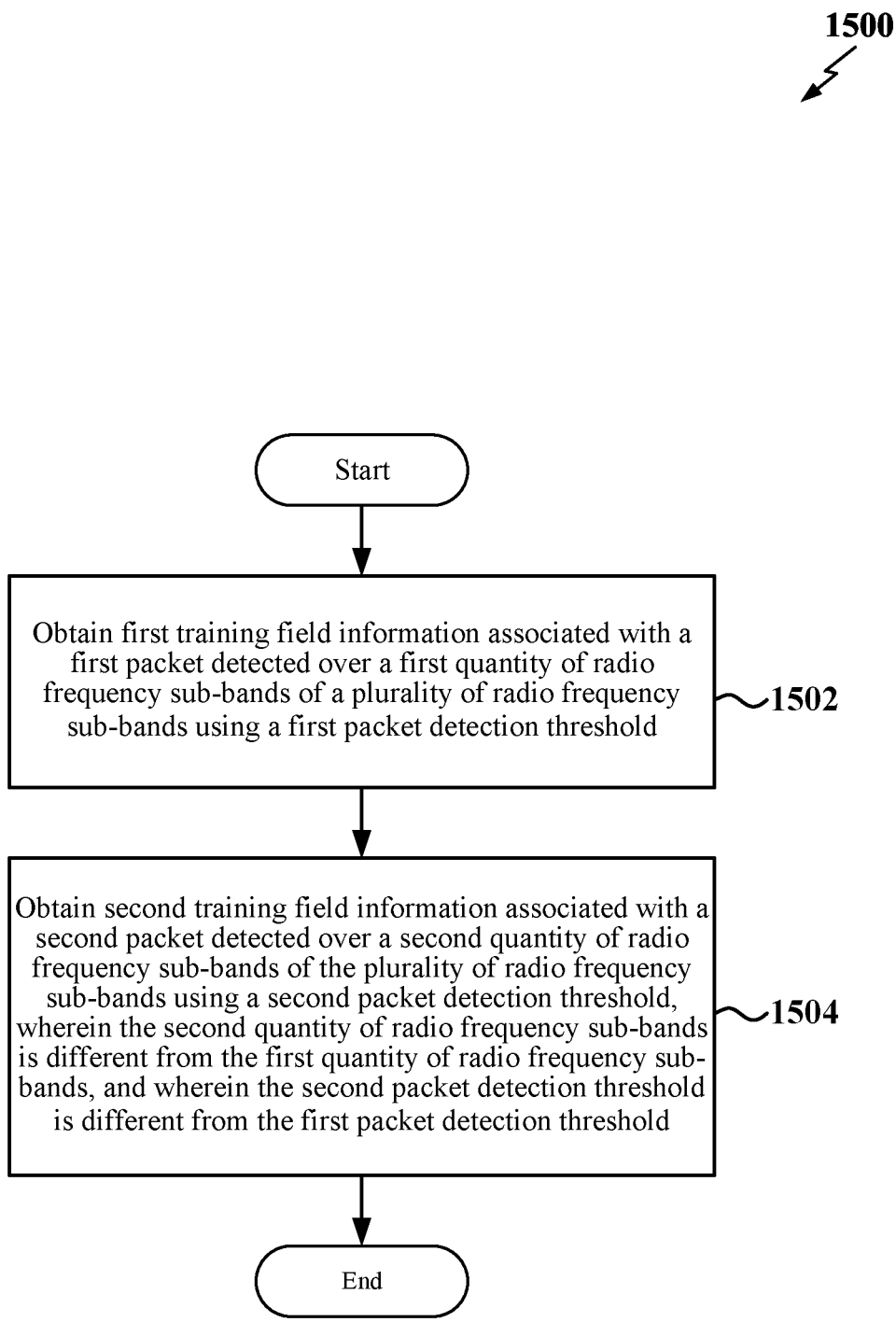
FIG. 15 is a flow chart illustrating an example communication method that relates to detecting a packet over radio frequency sub-bands according to some aspects.

FIG. 15 is a flow chart illustrating an example method 1500 for communication in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the apparatus 1300 illustrated in FIG. 13. In some examples, the method 1500 may be carried out by the apparatus 502 illustrated in FIG. 5. In some examples, the method 1500 may be performed by an access point or a STA. In some examples, the method 1500 may be carried out by any suitable apparatus or means for carrying out the functions or algorithm described below.

At block 1502, a first apparatus may obtain first training field information associated with a first packet detected over a first quantity of radio frequency sub-bands of a plurality of radio frequency sub-bands using a first packet detection threshold. For example, the signal detection circuitry 1342 in cooperation with the communication and processing circuitry 1341 and the transceiver 1310, shown and described above in connection with FIG. 13, may provide a means to obtain first training field information associated with a first packet detected over a first quantity of radio frequency sub-bands of a plurality of radio frequency sub-bands using a first packet detection threshold.

At block 1504, the first apparatus may obtain second training field information associated with a second packet detected over a second quantity of radio frequency sub-bands of the plurality of radio frequency sub-bands using a second packet detection threshold, wherein the second quantity of radio frequency sub-bands is different from the first quantity of radio frequency sub-bands, and wherein the second packet detection threshold is different from the first packet detection threshold. For example, the signal detection circuitry 1342 in cooperation with the communication and processing circuitry 1341 and the transceiver 1310, shown and described above in connection with FIG. 13, may provide a means to obtain second training field information associated with a second packet detected over a second quantity of radio frequency sub-bands of the plurality of radio frequency sub-bands using a second packet detection threshold.

In some examples, the first apparatus may obtain third training field information associated with a third packet detected over a third quantity of radio frequency sub-bands of the plurality of radio frequency sub-bands using a third packet detection threshold. In some examples, the third quantity of radio frequency sub-bands is different from the first quantity of radio frequency sub-bands. In some examples, the third packet detection threshold is different from the third packet detection threshold.

In some examples, the first apparatus may obtain fourth training field information associated with a fourth packet detected over a fourth quantity of radio frequency sub-bands of the plurality of radio frequency sub-bands using a fourth packet detection threshold. In some examples, the fourth quantity of radio frequency sub-bands is different from the first quantity of radio frequency sub-bands. In some examples, the fourth packet detection threshold is different from the third packet detection threshold.

In some examples, the first apparatus may obtain a signal indicative of a protocol data unit bandwidth used by a second apparatus. In some examples, the first apparatus may select a set of radio frequency sub-bands of the plurality of radio frequency sub-bands from the first quantity of radio frequency sub-bands and the second quantity of radio frequency sub-bands based on the protocol data unit bandwidth used by the second apparatus. In some examples, the first apparatus may detect signals on the set of radio frequency sub-bands.

In some examples, the first apparatus may perform signal detection on each radio frequency sub-band of the plurality of radio frequency sub-bands to realize a packet bandwidth used by a second apparatus. In some examples, the first apparatus may detect training field signals over the packet bandwidth used by the second apparatus.

In some examples, the first apparatus may receive the first training field information and the second training field information, wherein the first apparatus is configured as a wireless node.

In one configuration, the apparatus 1300 includes means for obtaining a training field signal of a packet from a second apparatus over at least two radio frequency sub-bands of a plurality of radio frequency sub-bands, training field information carried by the training field signal being duplicated over each of the at least two radio frequency sub-bands, means for obtaining a payload signal of the packet over the plurality of radio frequency sub-bands, payload information carried by the payload signal being duplicated over each of the plurality of radio frequency sub-bands, means for combining the payload information duplicated over each of the plurality of radio frequency sub-bands to provide a combined signal, and means for outputting the combined signal via the interface.

In one configuration, the apparatus 1300 includes means for obtaining a first training field signal of a first packet detected over a first quantity of radio frequency sub-bands of a plurality of radio frequency sub-bands using a first packet detection threshold, and means for obtaining a second training field signal of a second packet detected over a second quantity of radio frequency sub-bands of the plurality of radio frequency sub-bands using a second packet detection threshold, the second quantity of radio frequency sub-bands being different from the first quantity of radio frequency sub-bands, the second packet detection threshold being different from the first packet detection threshold. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 3, 4, 5, 8, 11, 13, and 16, and utilizing, for example, the methods and/or algorithms described herein in relation to FIGS. 14 and 15.

Figure 16:
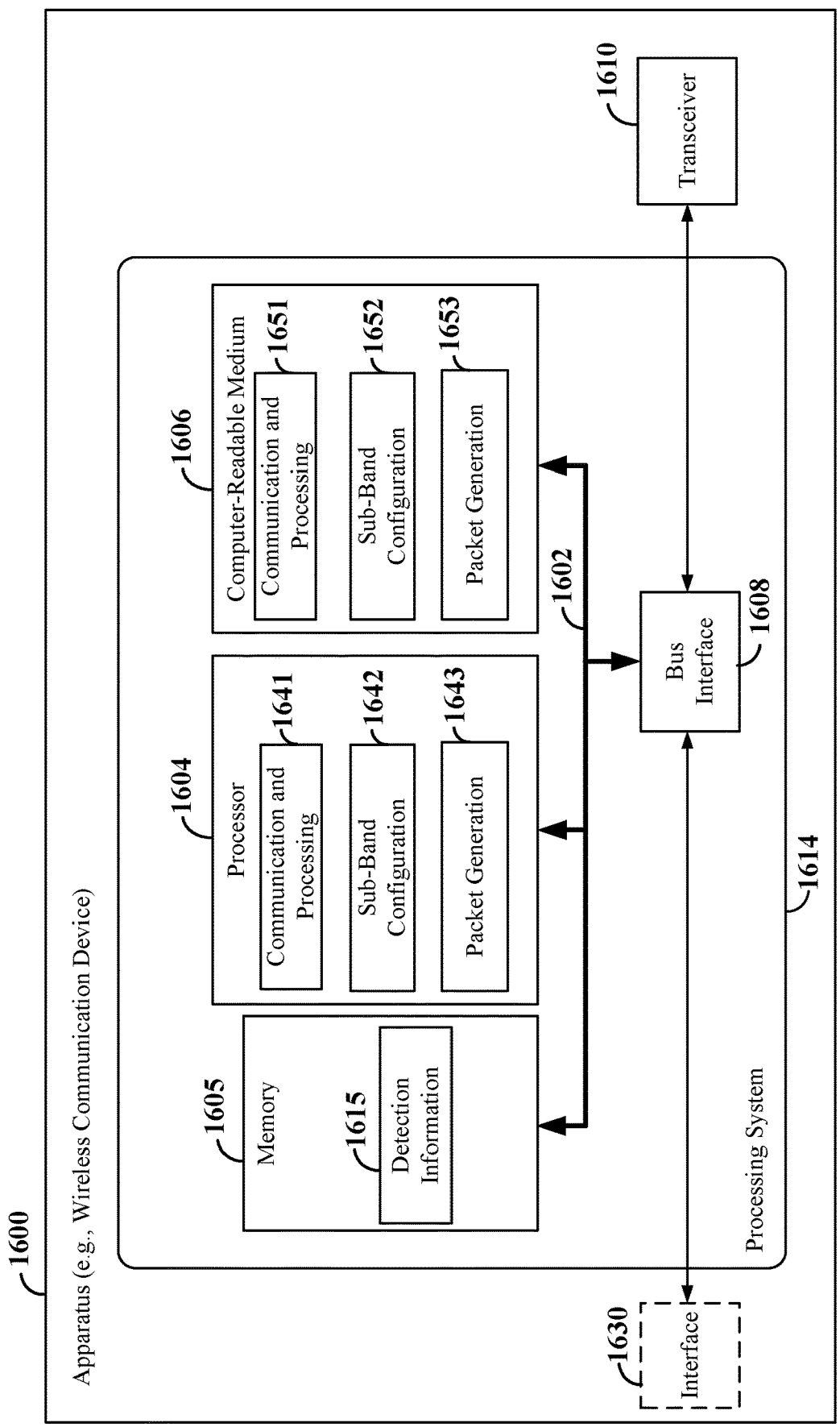
FIG. 16 is a block diagram conceptually illustrating an example of a hardware implementation for an apparatus (e.g., a wireless node such as a wireless communication device) employing a processing system according to some aspects of the disclosure.

FIG. 16 is a conceptual diagram illustrating an example of a hardware implementation for an apparatus 1600 employing a processing system 1614. For example, the apparatus 1600 may be a station (STA) or other device configured to wirelessly communicate with another device (e.g., an access point or a peer STA), as discussed in any one or more of FIGS. 1-12. In some implementations, the apparatus 1600 may correspond to one or more of the STAs 106 or the AP 104 of FIG. 1, the apparatus 202 of FIG. 2, the apparatus 500 or 502 of FIG. 5, or the STA 804, the STA 806, or the AP 802 of FIG. 8.

In accordance with various aspects of the disclosure, an element, or any portion of an element, or any combination of elements may be implemented with the processing system 1614 (e.g., that includes one or more processors 1604). The processing system 1614 may be substantially the same as the processing system 1314 illustrated in FIG. 13, including a bus interface 1608, a bus 1602, memory 1605, a processor 1604, and a computer-readable medium 1606. Furthermore, the apparatus 1600 may include an interface 1630 (e.g., a network interface) that provides a means for communicating with at least one other apparatus within at least one radio network. The memory 1605 may store detection information 1615 (e.g., sub-band detection thresholds) used by the processor 1604 for communication operations as described herein.

The apparatus 1600 may be configured to perform any one or more of the operations described herein (e.g., as described above in conjunction with FIGS. 1-12 and as described below in conjunction with FIG. 17). In some aspects of the disclosure, the processor 1604, as utilized in the apparatus 1600, may include circuitry configured for various functions.

In some aspects of the disclosure, the processor 1604 may include communication and processing circuitry 1641. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some implementations where the communication involves obtaining (e.g., receiving) information, the communication and processing circuitry 1641 may obtain information from a component of the apparatus 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for obtaining (e.g., obtaining information from another apparatus). In some examples, the communication and processing circuitry 1641 may include functionality for a means for receiving (e.g., receiving transmitted RF signals including information). In some examples, the communication and processing circuitry 1641 may include functionality for a means for decoding. In some examples, the communication and processing circuitry 1641 may include functionality for a means for receiving training field information and payload information.

In some implementations where the communication involves outputting (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for outputting (e.g., outputting data or other information to another apparatus). In some examples, the communication and processing circuitry 1641 may include functionality for a means for transmitting (e.g., transmitting data or other information via RF signals). In some examples, the communication and processing circuitry 1641 may include functionality for a means for encoding. In some examples, the communication and processing circuitry 1641 may include functionality for a means for transmitting training field information and payload information.

The processor 1604 may include sub-band configuration circuitry 1642 configured to perform sub-band configuration-related operations as discussed herein. The sub-band configuration circuitry 1642 may be configured to execute sub-band configuration software 1652 included on the computer-readable medium 1606 to implement one or more functions described herein.

The sub-band configuration circuitry 1642 may include functionality for a means for selecting a set of sub-bands. For example, the sub-band configuration circuitry 1642 may be configured to select a set of bands to be used for transmitting or receiving certain fields of a packet. In some examples, the sub-band configuration circuitry 1642 may be configured to determine which sub-bands to use to transmit a training field signal.

The processor 1604 may include packet generation circuitry 1643 configured to perform packet generation-related operations as discussed herein. The packet generation circuitry 1643 may be configured to execute packet generation software 1653 included on the computer-readable medium 1606 to implement one or more functions described herein.

The packet generation circuitry 1643 may include functionality for a means for outputting a signal (e.g., a training field signal and/or a payload signal). For example, the packet generation circuitry 1643 may be configured to generate a packet to be transmitted to another apparatus (e.g., an AP or a STA).

The packet generation circuitry 1643 may include functionality for a means for outputting training field information. For example, the packet generation circuitry 1643 may be configured to generate a packet including an STF and an LTF to be transmitted to another apparatus (e.g., an AP or a STA). The packet generation circuitry 1643 may also be configured to send the packet to another device of the apparatus 1600. In some examples, the packet generation circuitry 1643 may be configured to cooperate with the communication and processing circuitry 1641 and the transceiver 1610 to transmit the packet to the other apparatus.

The packet generation circuitry 1643 may include functionality for a means for outputting payload information. For example, the packet generation circuitry 1643 may be configured to generate a packet including payload data and to cause the packet to be transmitted to another apparatus (e.g., an AP or a STA). The packet generation circuitry 1643 may also be configured to send the packet to another device of the apparatus 1600. In some examples, the packet generation circuitry 1643 may be configured to cooperate with the communication and processing circuitry 1641 and the transceiver 1610 to transmit the packet to the other apparatus.

Figure 17:
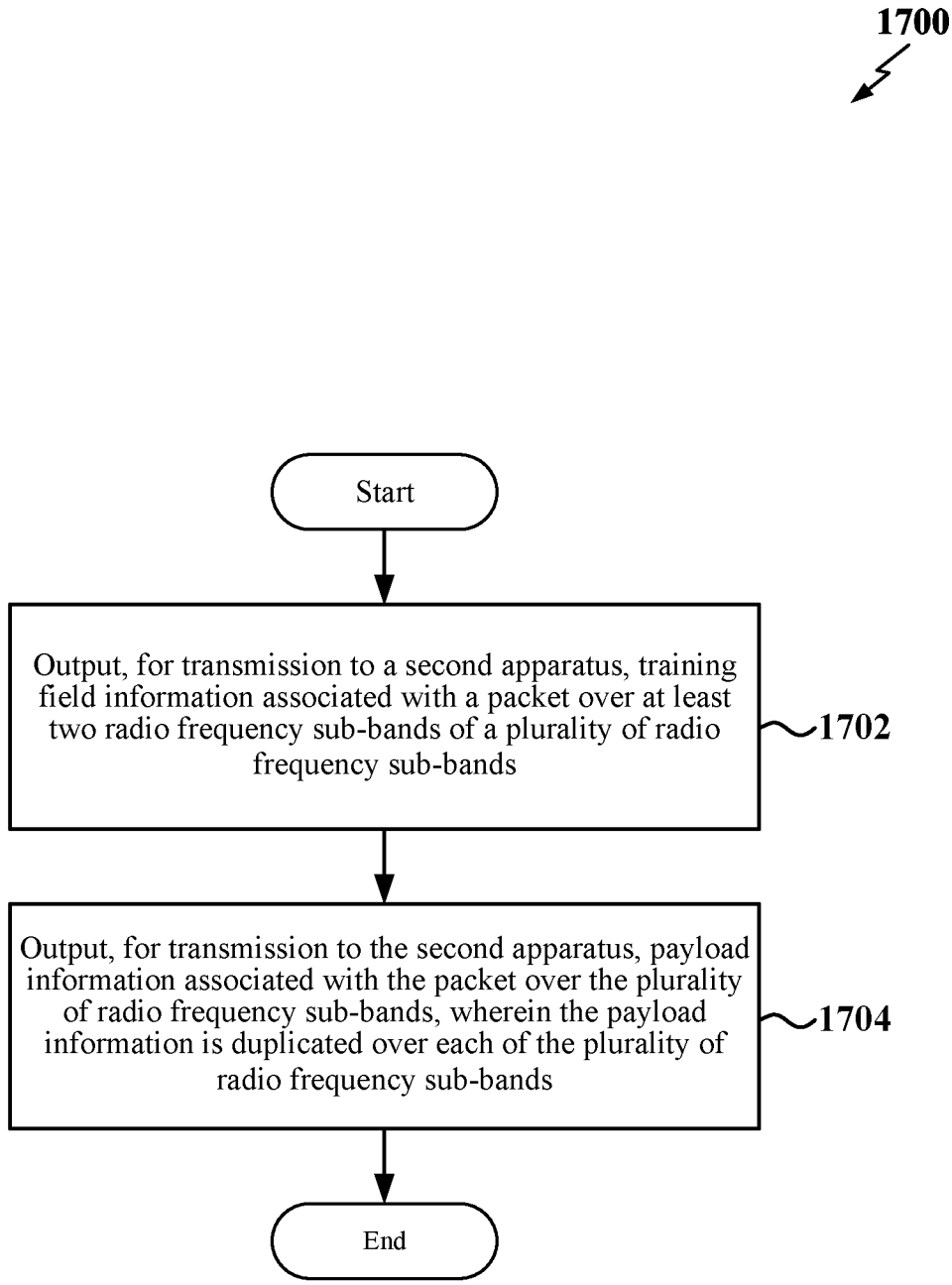
FIG. 17 is a flow chart illustrating an example communication method for outputting a packet according to some aspects.

FIG. 17 is a flow chart illustrating an example method 1700 for communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the apparatus 1600 illustrated in FIG. 16. In some examples, the method 1700 may be carried out by the apparatus 502 illustrated in FIG. 5. In some examples, the method 1700 may be performed by a STA or an access point. In some examples, the method 1700 may be carried out by any suitable apparatus or means for carrying out the functions or algorithm described below.

At block 1702, a first apparatus may output, for transmission to a second apparatus, training field information associated with a packet over at least two radio frequency sub-bands of a plurality of radio frequency sub-bands. For example, the packet generation circuitry 1643 in cooperation with the communication and processing circuitry 1641 and the transceiver 1610, shown and described above in connection with FIG. 16, may provide a means to output, for transmission to a second apparatus, training field information associated with a packet over at least two radio frequency sub-bands of a plurality of radio frequency sub-bands.

At block 1704, the first apparatus may output, for transmission to the second apparatus, payload information associated with the packet over the plurality of radio frequency sub-bands, wherein the payload information is duplicated over each of the plurality of radio frequency sub-bands. For example, the packet generation circuitry 1643 in cooperation with the communication and processing circuitry 1641 and the transceiver 1610, shown and described above in connection with FIG. 16, may provide a means to output, for transmission to the second apparatus, payload information associated with the packet over the plurality of radio frequency sub-bands.

In some examples, each radio frequency sub-band of the plurality of radio frequency sub-bands may include a 20 MHz bandwidth. In some examples, the plurality of radio frequency sub-bands may include a 320 MHz bandwidth. In some examples, the at least two radio frequency sub-bands of the plurality of radio frequency sub-bands may include a 40 MHz bandwidth, a 80 MHz bandwidth, a 160 MHz bandwidth, or the 320 MHz bandwidth.

In some examples, the packet may be a request-to-send packet, a clear-to-send packet, or an acknowledgement packet. In some example, the first apparatus may output the packet independent of very high throughput (VHT) training field information and VHT signal information. In some examples, the training field information may include legacy short training field information and legacy long training field information. In some examples, the packet does not include very high throughput (VHT) training field information or VHT signal information. In some examples, the payload information may include a request-to-send, a clear-to-send, or an acknowledgement.

In one configuration, the apparatus 1600 includes means for outputting, for transmission to a second apparatus, a training field signal of a packet from a second apparatus over at least two radio frequency sub-bands of a plurality of radio frequency sub-bands, and means for outputting, for transmission to the second apparatus, a payload signal of the packet over the plurality of radio frequency sub-bands, the information carried by the payload signal being duplicated over each of the plurality of radio frequency sub-bands. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 3, 4, 5, 8, 11, 13, and 16, and utilizing, for example, the methods and/or algorithms described herein in relation to FIG. 17.

The methods shown in FIGS. 14, 15, and 17 may include additional aspects, such as any single aspect or any combination of aspects described below and/or in connection with one or more other processes described elsewhere herein. The following provides an overview of several aspects of the present disclosure.

Aspect 1: A method for communication at a first apparatus, the method comprising: obtaining training field information associated with a packet from a second apparatus over at least two radio frequency sub-bands of a plurality of radio frequency sub-bands, wherein the training field information comprises a training field sequence that is duplicated over each of the at least two radio frequency sub-bands; obtaining payload information associated with the packet over the plurality of radio frequency sub-bands, wherein the payload information comprises payload data that is duplicated over each of the plurality of radio frequency sub-bands; combining the payload data duplicated over each of the plurality of radio frequency sub-bands to provide combined payload data; and outputting the combined payload data.

Aspect 2: The method of aspect 1, wherein each radio frequency sub-band of the plurality of radio frequency sub-bands comprises a 20 MHz bandwidth.

Aspect 3: The method of aspect 1 or 2, wherein the at least two radio frequency sub-bands of the plurality of radio frequency sub-bands comprise two radio frequency sub-bands, four radio frequency sub-bands, eight radio frequency sub-bands, or sixteen radio frequency sub-bands.

Aspect 4: The method of any of aspects 1 through 3, wherein the at least two radio frequency sub-bands of the plurality of radio frequency sub-bands comprise fewer radio frequency sub-bands than the plurality of radio frequency sub-bands.

Aspect 5: The method of any of aspects 1 through 4, further comprising: detecting the packet based on a threshold associated with how many radio frequency sub-bands are included in the at least two radio frequency sub-bands.

Aspect 6: The method of any of aspects 1 through 4, further comprising: using a first threshold for detecting the packet over two radio frequency sub-bands of the plurality of radio frequency sub-bands; using a second threshold different from the first threshold for detecting the packet over four radio frequency sub-bands of the plurality of radio frequency sub-bands; using a third threshold different from the first threshold for detecting the packet over eight radio frequency sub-bands of the plurality of radio frequency sub-bands; and using a fourth threshold different from the first threshold for detecting the packet over sixteen radio frequency sub-bands of the plurality of radio frequency sub-bands.

Aspect 7: The method of any of aspects 1 through 6, wherein: the processing system is further configured to output the packet independent of very high throughput (VHT) training field information or VHT signal information; and the packet is a request-to-send packet, a clear-to-send packet, or an acknowledgement packet.

Aspect 8: The method of any of aspects 1 through 7, wherein the training field information comprises legacy short training field information and a legacy long training field information.

Aspect 9: The method of aspect 8, further comprising: further comprising: combining the legacy short training field information duplicated over the at least radio frequency two sub-bands to obtain automatic gain control information; decoding the long training field information based on the automatic gain control information to obtain synchronization information; and obtaining the payload data based on the synchronization information.

Aspect 10: The method of any of aspects 1 through 9, further comprising: receiving the first training field information and the payload information, wherein the first apparatus is configured as a wireless node.

Aspect 11: A method for communication at a first apparatus, the method comprising: obtaining first training field information associated with a first packet detected over a first quantity of radio frequency sub-bands of a plurality of radio frequency sub-bands using a first packet detection threshold; and obtaining second training field information associated with a second packet detected over a second quantity of radio frequency sub-bands of the plurality of radio frequency sub-bands using a second packet detection threshold, wherein the second quantity of radio frequency sub-bands is different from the first quantity of radio frequency sub-bands, and wherein the second packet detection threshold is different from the first packet detection threshold.

Aspect 12: The method of aspect 11, further comprising: obtaining third training field information associated with a third packet detected over a third quantity of radio frequency sub-bands of the plurality of radio frequency sub-bands using a third packet detection threshold, wherein the third quantity of radio frequency sub-bands is different from the first quantity of radio frequency sub-bands, and wherein the third packet detection threshold is different from the third packet detection threshold.

Aspect 13: The method of aspect 12, further comprising: obtaining fourth training field information associated with a fourth packet detected over a fourth quantity of radio frequency sub-bands of the plurality of radio frequency sub-bands using a fourth packet detection threshold, wherein the fourth quantity of radio frequency sub-bands is different from the first quantity of radio frequency sub-bands, and wherein the fourth packet detection threshold is different from the third packet detection threshold.

Aspect 14: The method of any of aspects 11 through 13, further comprising: obtaining a signal indicative of a protocol data unit bandwidth used by a second apparatus; selecting a set of radio frequency sub-bands of the plurality of radio frequency sub-bands from the first quantity of radio frequency sub-bands and the second quantity of radio frequency sub-bands based on the protocol data unit bandwidth used by the second apparatus; and detecting signals on the set of radio frequency sub-bands.

Aspect 15: The method of any of aspects 11 through 13, further comprising: performing signal detection on each radio frequency sub-band of the plurality of radio frequency sub-bands to realize a packet bandwidth used by a second apparatus; and detecting training field signals over the packet bandwidth used by the second apparatus.

Aspect 16: The method of any of aspects 11 through 15, further comprising: receiving the first training field information and the second training field information, wherein the first apparatus is configured as a wireless node.

Aspect 17: A method for communication at a first apparatus, the method comprising: outputting, for transmission to a second apparatus, training field information associated with a packet over at least two radio frequency sub-bands of a plurality of radio frequency sub-bands; and outputting, for transmission to the second apparatus, payload information associated with the packet over the plurality of radio frequency sub-bands, wherein the payload information is duplicated over each of the plurality of radio frequency sub-bands.

Aspect 18: The method of aspect 17, wherein each radio frequency sub-band of the plurality of radio frequency sub-bands comprises a 20 MHz bandwidth.

Aspect 19: The method of any of aspects 17 through 18, wherein: the plurality of radio frequency sub-bands comprises a 320 MHz bandwidth; and the at least two radio frequency sub-bands of the plurality of radio frequency sub-bands comprises a 40 MHz bandwidth, a 80 MHz bandwidth, a 160 MHz bandwidth, or the 320 MHz bandwidth.

Aspect 20: The method of any of aspects 17 through 19, wherein at least one of: the training field information comprises legacy short training field information and legacy long training field information; the processing system is further configured to output the packet independent of very high throughput (VHT) training field information or VHT signal information; or the packet is a request-to-send packet, a clear-to-send packet, or an acknowledgement packet.

Aspect 21: A wireless node, comprising: at least one transceiver; a memory comprising instructions; and one or more processors configured to execute the instructions and cause the user equipment or network entity to perform a method in accordance with any one or more of aspects 1 through 9, wherein the at least one transceiver is configured to receive the first indication of at least one active group and transmit the signals via the at least one antenna port.

Aspect 22: A first apparatus configured for communication comprising at least one means for performing any one or more of aspects 1 through 10.

Aspect 23: A non-transitory computer-readable medium storing computer-executable code, comprising code for causing a first apparatus to perform any one or more of aspects 1 through 10.

Aspect 24: A wireless node, comprising: at least one transceiver; a memory comprising instructions; and one or more processors configured to execute the instructions and cause the wireless device to perform a method in accordance with any one or more of aspects 11 through 15, wherein the at least one transceiver is configured to transmit the first indication of at least one active group and receive the signals from the second apparatus.

Aspect 25: A first apparatus configured for communication comprising at least one means for performing any one or more of aspects 11 through 16.

Aspect 26: A non-transitory computer-readable medium storing computer-executable code, comprising code for causing a first apparatus to perform any one or more of aspects 11 through 16.

Aspect 27: A wireless node, comprising: at least one transceiver; a memory comprising instructions; and one or more processors configured to execute the instructions and cause the wireless device to perform a method in accordance with any one or more of aspects 17 through 20, wherein the at least one transceiver is configured to transmit the first indication of at least one active group and receive the signals from the second apparatus.

Aspect 28: A first apparatus configured for communication comprising at least one means for performing any one or more of aspects 17 through 20.

Aspect 29: A non-transitory computer-readable medium storing computer-executable code, comprising code for causing a first apparatus to perform any one or more of aspects 17 through 20.

Aspect 30: A first apparatus, comprising: a memory comprising instructions; and one or more processors configured to execute the instructions and cause the first apparatus to perform a method in accordance with any one or more of aspects 1 through 9.

Aspect 31: A first apparatus, comprising: a memory comprising instructions; and one or more processors configured to execute the instructions and cause the first apparatus to perform a method in accordance with any one or more of aspects 11 through 15.

Aspect 32: A first apparatus, comprising: a memory comprising instructions; and one or more processors configured to execute the instructions and cause the first apparatus to perform a method in accordance with any one or more of aspects 17 through 20.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within systems defined by the IEEE 802.11 (Wi-Fi) standards such as 802.11ax, 802.11be, and so on. Various aspects may also be extended to systems defined by the 3rd Generation Partnership Project (3GPP) such 5G, as Long-Term Evolution (LTE), the Evolved Packet System (EPS), the Universal Mobile Telecommunication System (UMTS), and/or the Global System for Mobile (GSM)CDMA2000 and/or Evolution-Data Optimized (EV-DO). Other examples may be implemented within systems employing IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 5, 8, 11, 13, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for communication, comprising:
an interface; and
a processing system configured to:
  obtain, via the interface, training field information associated with a packet from a second apparatus over at least two radio frequency sub-bands of a plurality of radio frequency sub-bands, wherein the training field information comprises a training field sequence that is duplicated over each of the at least two radio frequency sub-bands,
  obtain, via the interface, payload information associated with the packet over the plurality of radio frequency sub-bands, wherein the payload information comprises payload data that is duplicated over each of the plurality of radio frequency sub-bands,
  combine the payload data duplicated over each of the plurality of radio frequency sub-bands to provide combined payload data, and
  output the combined payload data via the interface.

2. The first apparatus of claim 1, wherein each radio frequency sub-band of the plurality of radio frequency sub-bands comprises a 20 MHz bandwidth.

3. The first apparatus of claim 1, wherein the at least two radio frequency sub-bands of the plurality of radio frequency sub-bands comprise two radio frequency sub-bands, four radio frequency sub-bands, eight radio frequency sub-bands, or sixteen radio frequency sub-bands.

4. The first apparatus of claim 1, wherein the at least two radio frequency sub-bands of the plurality of radio frequency sub-bands comprise fewer radio frequency sub-bands than the plurality of radio frequency sub-bands.

5. The first apparatus of claim 1, wherein the processing system is further configured to:
    detect the packet based on a threshold associated with how many radio frequency sub-bands are included in the at least two radio frequency sub-bands.

6. The first apparatus of claim 1, wherein the processing system is further configured to:
    use a first threshold for detecting the packet over two radio frequency sub-bands of the plurality of radio frequency sub-bands;
    use a second threshold different from the first threshold for detecting the packet over four radio frequency sub-bands of the plurality of radio frequency sub-bands;
    use a third threshold different from the first threshold for detecting the packet over eight radio frequency sub-bands of the plurality of radio frequency sub-bands; and
    use a fourth threshold different from the first threshold for detecting the packet over sixteen radio frequency sub-bands of the plurality of radio frequency sub-bands.

7. The first apparatus of claim 1, wherein:
    the processing system is further configured to output the packet independent of very high throughput (VHT) training field information or VHT signal information; and
    the packet is a request-to-send packet, a clear-to-send packet, or an acknowledgement packet.

8. The first apparatus of claim 1, wherein the training field information comprises legacy short training field information and a legacy long training field information.

9. The first apparatus of claim 8, wherein the processing system is further configured to:
    combine the legacy short training field information duplicated over the at least two radio frequency sub-bands to obtain automatic gain control information;
    decode the legacy long training field information based on the automatic gain control information to obtain synchronization information; and
    obtain the payload data based on the synchronization information.

10. The first apparatus of claim 1, further comprising:
    a receiver configured to receive the training field information and the payload information,
    wherein the first apparatus is configured as a wireless node.

11. A first apparatus for communication, comprising:
    an interface; and
    a processing system configured to:
        obtain, via the interface, a signal indicative of a protocol data unit bandwidth used by a second apparatus,
        select a set of radio frequency sub-bands of a plurality of radio frequency sub-bands, including a first quantity of radio frequency sub-bands and a second quantity of radio frequency sub-bands, based on the protocol data unit bandwidth used by the second apparatus,
        detect signals on the set of radio frequency sub-bands,
        obtain, via the interface, first training field information associated with a first packet detected over the first quantity of radio frequency sub-bands of the plurality of radio frequency sub-bands using a first packet detection threshold, and
        obtain, via the interface, second training field information associated with a second packet detected over the second quantity of radio frequency sub-bands of the plurality of radio frequency sub-bands using a second packet detection threshold, wherein the second quantity of radio frequency sub-bands is different from the first quantity of radio frequency sub-bands, and wherein the second packet detection threshold is different from the first packet detection threshold.

12. The first apparatus of claim 11, wherein the processing system is further configured to:
    obtain, via the interface, third training field information associated with a third packet detected over a third quantity of radio frequency sub-bands of the plurality of radio frequency sub-bands using a third packet detection threshold, wherein the third quantity of radio frequency sub-bands is different from the first quantity of radio frequency sub-bands, and wherein the third packet detection threshold is different from the third-first packet detection threshold.

13. The first apparatus of claim 12, wherein the processing system is further configured to:
    obtain, via the interface, fourth training field information associated with a fourth packet detected over a fourth quantity of radio frequency sub-bands of the plurality of radio frequency sub-bands using a fourth packet detection threshold, wherein the fourth quantity of radio frequency sub-bands is different from the first quantity of radio frequency sub-bands, and wherein the fourth packet detection threshold is different from the third-first packet detection threshold.

14. The first apparatus of claim 11, wherein the processing system is configured to:
    perform signal detection on each radio frequency sub-band of the plurality of radio frequency sub-bands to realize a packet bandwidth used by the second apparatus; and
    detect training field signals over the packet bandwidth used by the second apparatus.

15. The first apparatus of claim 11, further comprising:
    a receiver configured to receive the first training field information and the second training field information,
    wherein the first apparatus is configured as a wireless node.

16. A first apparatus for communication, comprising:
    an interface; and
    a processing system configured to:
        output, via the interface for transmission to a second apparatus, training field information of a packet over at least two radio frequency sub-bands of a plurality of radio frequency sub-bands, and
        output, via the interface for transmission to the second apparatus, payload information associated with the packet over the plurality of radio frequency sub-bands, wherein the payload information is duplicated over each of the plurality of radio frequency sub-bands.

17. The first apparatus of claim 16, wherein each radio frequency sub-band of the plurality of radio frequency sub-bands comprises a 20 MHz bandwidth.

18. The first apparatus of claim 16, wherein:
- the plurality of radio frequency sub-bands comprises a 320 MHz bandwidth; and
- the at least two radio frequency sub-bands of the plurality of radio frequency sub-bands comprises a 40 MHz bandwidth, a 80 MHz bandwidth, a 160 MHz bandwidth, or the 320 MHz bandwidth.

19. The first apparatus of claim 16, wherein at least one of:
- the training field information comprises legacy short training field information and legacy long training field information;
- the processing system is further configured to output the packet independent of very high throughput (VHT) training field information or VHT signal information; or
- the packet is a request-to-send packet, a clear-to-send packet, or an acknowledgement packet.

* * * * *